(12) United States Patent
Je et al.

(10) Patent No.: US 10,551,069 B2
(45) Date of Patent: Feb. 4, 2020

(54) OVEN

(71) Applicant: Samsung Electronics Co., Ltd., Suwon-si (KR)

(72) Inventors: Ji-Woon Je, Suwon-si (KR); Byoung Woo Ko, Suwon-si (KR); Gwang Jin Jung, Suwon-si (KR); Jung Kwon Kim, Seoul (KR); Chun Seong Kim, Suwon-si (KR); Sung Soo Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 185 days.

(21) Appl. No.: 15/609,258

(22) Filed: May 31, 2017

(65) Prior Publication Data

US 2017/0350603 A1 Dec. 7, 2017

(30) Foreign Application Priority Data

Jun. 3, 2016 (KR) .................. 10-2016-0069532

(51) Int. Cl.
| | |
|---|---|
| *F24C 15/00* | (2006.01) |
| *F21V 29/67* | (2015.01) |
| *F21V 21/14* | (2006.01) |
| *F24C 15/02* | (2006.01) |
| *F21V 8/00* | (2006.01) |
| *F21W 131/307* | (2006.01) |

(52) U.S. Cl.
CPC ............ *F24C 15/008* (2013.01); *F21V 21/14* (2013.01); *F21V 29/67* (2015.01); *F24C 15/021* (2013.01); *G02B 6/0015* (2013.01); *G02B 6/0055* (2013.01); *G02B 6/0065* (2013.01); *G02B 6/0075* (2013.01); *G02B 6/0096* (2013.01); *F21W 2131/307* (2013.01)

(58) Field of Classification Search
CPC .... F24C 15/008; F24C 15/021; G02B 6/0096; G02B 6/0015; G02B 6/0095; G02B 6/0035; G02B 6/0055; G02B 6/0065; G02B 6/0075; F21W 2131/307
See application file for complete search history.

(56) References Cited

U.S. PATENT DOCUMENTS

| | | | |
|---|---|---|---|
| 2008/0123325 A1* | 5/2008 | Littau | F24C 15/008 362/92 |
| 2009/0316385 A1* | 12/2009 | Weber | F21K 9/00 362/92 |

(Continued)

FOREIGN PATENT DOCUMENTS

| | | |
|---|---|---|
| EP | 1995522 | 11/2008 |
| EP | 1620680 | 3/2009 |

(Continued)

OTHER PUBLICATIONS

International Search Report dated Sep. 4, 2017 in International Patent Application No. PCT/KR2017/005738.

*Primary Examiner* — David V Bruce
(74) *Attorney, Agent, or Firm* — Staas & Halsey LLP

(57) ABSTRACT

An oven includes a main body having a cooking room, a door disposed in the main body to open or close the cooking room, a door having a window to view the inside of the cooking room, a light emitting member disposed in the door, and a guide member to guide light of the light emitting member toward the cooking room.

28 Claims, 24 Drawing Sheets

(56) References Cited

U.S. PATENT DOCUMENTS

| | | | |
|---|---|---|---|
| 2011/0149551 A1* | 6/2011 | Camarillo Fernandez | ................... F24C 15/008 362/92 |
| 2012/0170247 A1 | 7/2012 | Do | |
| 2013/0081610 A1* | 4/2013 | Eichelberger | ......... F24C 15/008 126/273 R |
| 2013/0201657 A1 | 8/2013 | Arrigoni et al. | |

FOREIGN PATENT DOCUMENTS

| | | |
|---|---|---|
| EP | 2653786 | 10/2013 |
| WO | 2016/012177 | 1/2016 |

* cited by examiner (a)

(b)

(c)

(d)

OVEN

CROSS-REFERENCE TO RELATED APPLICATIONS

This application claims the benefit of Korean Patent Application No. 10-2016-0069532, filed on Jun. 3, 2016 in the Korean Intellectual Property Office, the disclosure of which is incorporated herein by reference.

BACKGROUND

1. Field

Embodiments of the present disclosure relate to an oven having a structure in which a door to open or close a cooking room is provided with a light illuminating the inside of the cooking room.

2. Description of the Related Art

Generally, an oven is equipment to cook food by including a cooking room, a heating device for applying heat to the cooking room, and a circulation fan for circulating heat generated by the heating device inside the cooking room.

The oven, which is cooking equipment of sealing up and heating food to cook it, is classified into an electric oven, a gas oven, and an electronic oven (also, called a microwave). The electric oven uses an electric heater as a heat source, and the gas oven and the microwave use heat generated by gas and friction heat of water molecules, respectively, as heat sources.

During cooking using the oven, it is necessary to check the cooking state of food without opening the door to prevent heat loss from the cooking room. For this, a window is mounted on the door, and a light for illuminating the cooking room is provided.

If the light is disposed in the inside of the cooking room, a user may directly look at the light placed inside the cooking room to be dazzled by the light when he/she looks at food through the window in order to check the cooking state of the food.

Meanwhile, if the light is disposed in the inside of the door, light is multi-reflected or spreads by a glass panel, etc. disposed in the inside of the door, which deteriorates visibility.

SUMMARY

Therefore, it is an aspect of the present disclosure to provide an oven having a structure in which a light emitting member for illuminating a cooking room and a guide member for guiding light emitted from the light emitting member toward the inside of the cooking room are disposed in a door.

It is an aspect of the present disclosure to provide an oven including a door provided with a light for selectively illuminating an upper portion and a lower portion of the inside of the cooking room.

It is an aspect of the present disclosure to provide an oven including a door provided with a light for selectively illuminating food placed to the left and food placed to the right inside a cooking room.

It is an aspect of the present disclosure to provide an oven including a door capable of detachably attaching a light on the outer surface to illuminate food.

It is an aspect of the present disclosure to provide an oven having a structure in which a light emitting member for illuminating a cooking room is disposed in a door, and a guide portion is provided in a panel forming a window of the door.

It is an aspect of the present disclosure to provide an oven in which a light emitting member is disposed in a door, and a door frame of the door is configured to form a path of light generated from the light emitting member.

Additional aspects of the disclosure will be set forth in part in the description which follows and, in part, will be obvious from the description, or may be learned by practice of the disclosure.

In accordance with an aspect of the present disclosure, there is provided an oven including: a main body having a cooking room; a door disposed in the main body, and configured to open or close the cooking room, the door including a window to enable a user to look at the inside of the cooking room; a light emitting member disposed in the door; and a guide member disposed in the door, and configured to guide light from the light emitting member toward the cooking room.

The light emitting member and the guide member may be disposed on at least one portion of the left, right, upper, and lower portions of the window.

The light emitting member and the guide member may be disposed on at least one portion of the left lower portion, the left upper portion, the right lower portion, and the right upper portion of the window.

The light emitting member and the guide member may be disposed on at least one portion of the upper left portion, the upper right portion, the lower left portion, and the lower right portion of the window.

The guide member may include a solid member or a hollow member.

The guide member including the hollow member may include a reflecting surface to transmit light entered the incident end from the light emitting member to the emitting end.

The guide member may include a first portion extending in a first direction from the incident surface, and a second portion bent from the first portion and extending in a second direction.

The guide member may include a plate-shaped member having a straight cross section.

The guide member may include a plate-shaped member having a curved cross section.

The light emitting member may include a light emitting element, and a printed circuit board on which the light emitting element is mounted. In the light emitting member, the printed circuit board may be perpendicular to the incident surface of the guide member.

In the light emitting member, the printed circuit board may be parallel to the window.

In the light emitting member, the printed circuit board may be perpendicular to the window.

The guide member may be disposed parallel to the window, and includes a reflecting surface formed to refract light from the light emitting member toward the cooking room.

The incident surface or the emitting surface of the guide member may include one of a flat surface, an inclined surface, a convex surface, and a concave surface.

The emitting surface of the guide member may include at least one of an irregular bumpy surface, a regular bumpy surface, and a printed surface.

The guide member may include a reflecting plate configured to reflect light from the light emitting member toward the cooking room.

The door further includes a handle, and the light emitting member may be disposed inside the handle.

The light emitting member may be detachably attached on the outer surface of the window.

In accordance with an aspect of the present disclosure, there is provided an oven including: a main body having a cooking room; and a door disposed in the main body, and configured to open or close the cooking room. The door may include: a light emitting member configured to illuminate the cooking room; a window configured to enable a user to look at the inside of the cooking room; and a panel forming the window, and including a guide portion configured to guide light from the light emitting member toward the cooking room.

The light emitting member may be disposed on at least one portion of the left, right, upper, and lower portions of the panel. The guide portion may include a reflecting surface configured to refract light entered into the panel from the light emitting member toward the cooking room.

The reflecting surface may include at least one of an irregular bumpy surface, a regular bumpy surface, and a printed surface.

The reflecting surface may be provided on one portion of the panel corresponding to the portion on which the light emitting member is disposed.

The guide portion may include an anti-reflective coating portion configured to transmit light from the light emitting member without reflecting the light.

The door may further include a handle disposed on the outer portion of the door, the light emitting member is disposed inside the handle, and light generated from the light emitting member passes through the anti-reflective coating portion to be guided to the inside of the cooking room.

The panel may include a plurality of guide portions, the light emitting member is disposed in an illuminating device configured to be detachably attached on the panel, and the illuminating device is attached at a position corresponding to one guide portion of the plurality of guide portions, and configured to illuminate light toward the cooking room.

The illuminating device may include: a power supply configured to supply electric power to the light emitting member; and a transceiver configured to exchange signals with the main body.

The door may include a fan configured to cool heat generated by the light emitting member.

The light emitting member may include a light emitting element, a printed circuit board on which the light emitting element is mounted, and a heat dissipating board attached on a rear surface of the printed circuit board.

The light emitting member may be disposed to be directly attached on the panel.

In accordance with an aspect of the present disclosure, there is provided an oven including: a main body having a cooking room; and a door disposed in the main body, and configured to open or close the cooking room. The door may include: a plurality of panels configured to enable a user to look at the inside of the cooking room; a light emitting member configured to illuminate the inside of the cooking room; and an internal structure configured to support the plurality of panels, and to form a path of light generated from the light emitting member.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
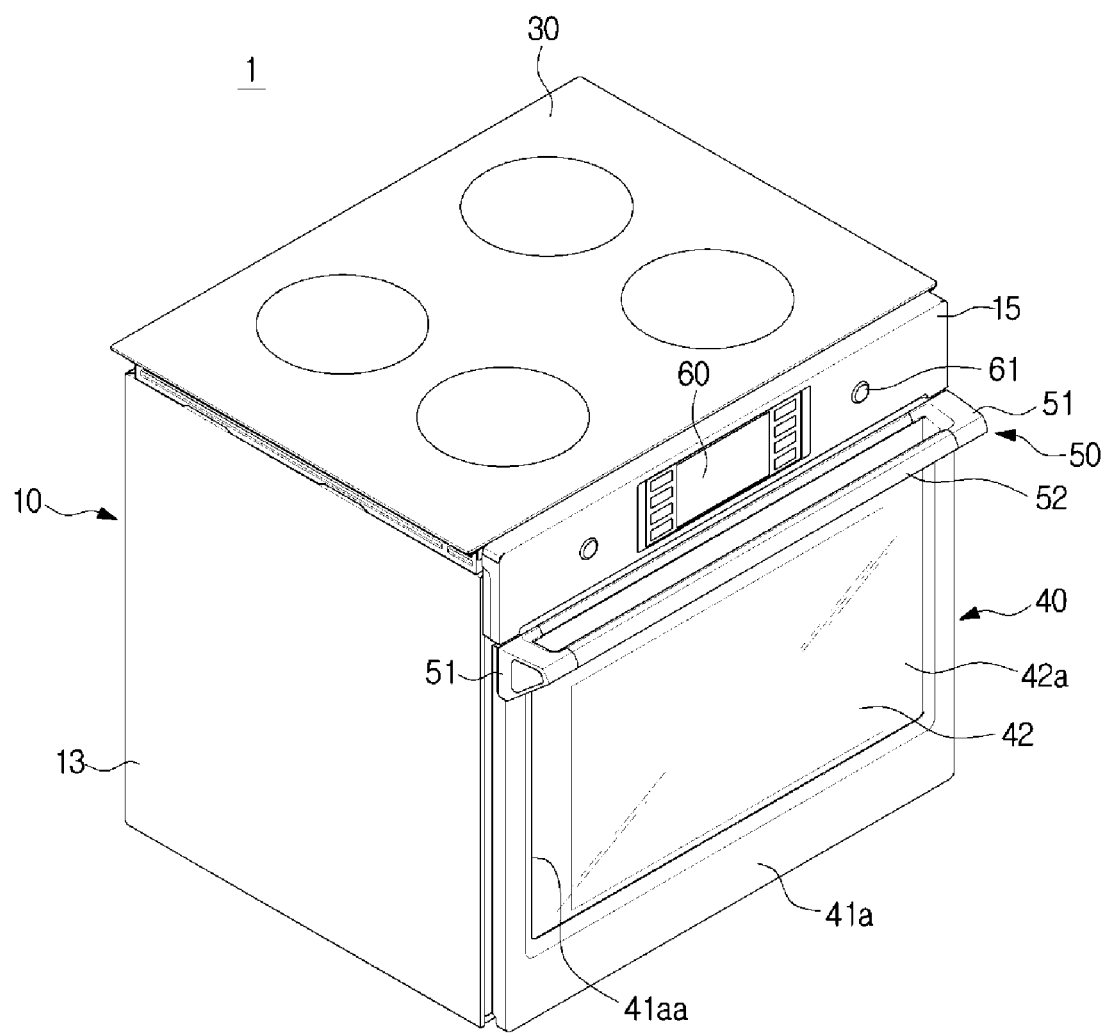
FIG. 1 is a perspective view of an oven according to an embodiment of the present disclosure.

Reference will now be made in detail to the embodiments, examples of which are illustrated in the accompanying drawings, wherein like reference numerals refer to the like elements throughout. The embodiments are described below by referring to the figures.

Configurations illustrated in the embodiments and the drawings described in the present specification are only exemplary embodiments of the present disclosure, and thus it is to be understood that various modified examples, which may replace the embodiments and the drawings described in the present specification, are possible when filing the present application.

Also, like reference numerals or symbols used in the drawings of the present specification represent members or components performing the substantially same functions.

Also, the terms used in the present specification are used to describe the embodiments of the present disclosure. Accordingly, it should be apparent to those skilled in the art that the following description of exemplary embodiments is provided for illustration purpose only and not for the purpose of limiting the embodiments as defined by the appended claims and their equivalents. It is to be understood that the singular forms "a," "an," and "the" include plural referents unless the context clearly dictates otherwise. In this specification, it will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the embodiments of the present disclosure will be described in detail with reference to the accompanying drawings.

Hereinafter, the front surface and the forward direction are referred to as the front surface and the forward direction of an oven 1 shown in FIG. 1, and the rearward direction refers to a rearward direction of the oven 1.

Figure 2:
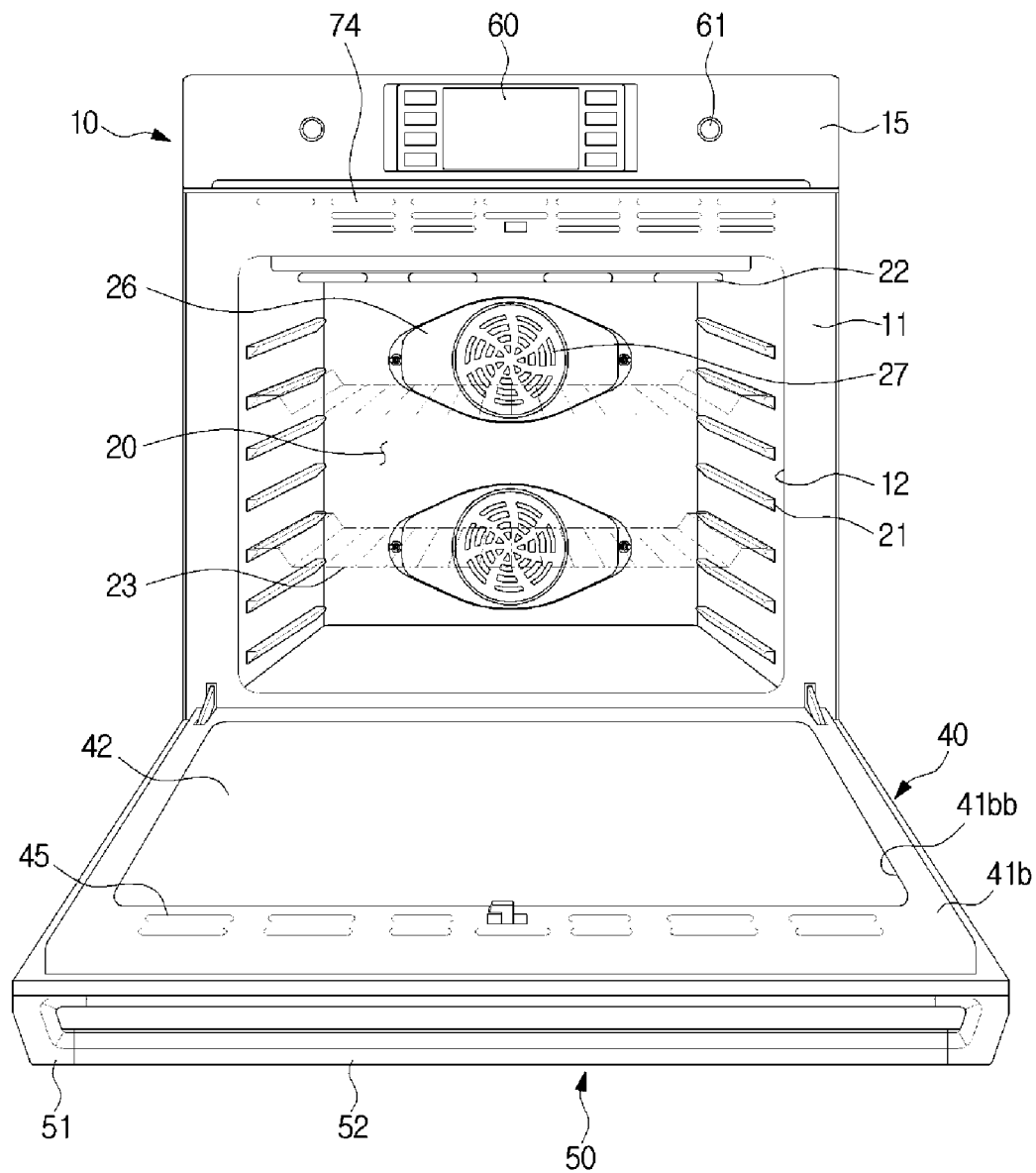
FIG. 2 shows a state in which a door of the oven according to an embodiment of the present disclosure opens.
Figure 3:
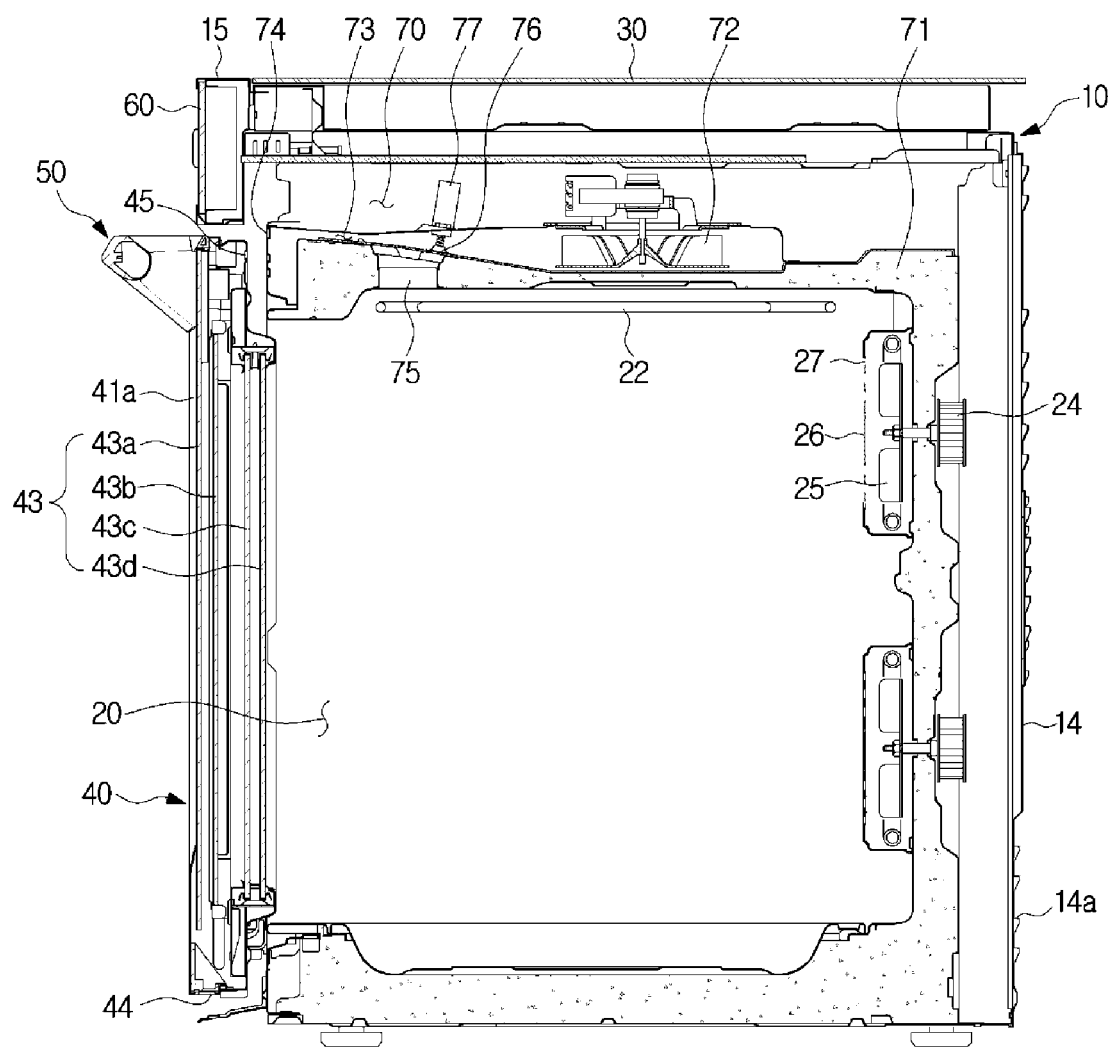
FIG. 3 is a side cross-sectional view of the oven according to an embodiment of the present disclosure.

FIG. 1 is a perspective view of an oven according to an embodiment of the present disclosure, and FIG. 2 shows a state in which a door of the oven according to an embodiment of the present disclosure opens. FIG. 3 is a side cross-sectional view of the oven according to an embodiment of the present disclosure.

Referring to FIGS. 1, 2, and 3, an oven 1 may include a main body 10 having a cooking room, or compartment, 20 thereinside, and a cooktop 30 mounted on the top of the main body 10 and configured to heat a container with food thereon.

The main body 10 may include a front panel 11 forming the front surface of the main body 10, side panels 13 forming the side surfaces of the main body 10, and a rear panel 14 forming the rear surface of the main body 10.

The cooking room 20 may be provided in the shape of a box inside the main body 10, wherein the front part of the cooking room 20 opens so as for a user to be able to put or take food into or out of the cooking room 20. In the front panel 11, an opening 12 may be provided to correspond to the open front part of the cooking room 20. The open front part of the cooking room 20 may be opened or closed by a door unit 40.

In the inside of the cooking room 20, a plurality of support bars 21 may be disposed. On the plurality of support bars 21, a rack 23 on which food can be put may be placed. The plurality of support bars 21 may protrude from the left and right walls of the cooking room 20.

A divider (not shown) for dividing the cooking room 20 may be removably disposed on the plurality of supports 21. More specifically, the divider (not shown) may be disposed horizontally in the cooking room 20 to divide the cooking room 20 into a plurality of cooking rooms 20.

The plurality of cooking rooms 20 may have different sizes. The divider may be made of an insulating material to insulate the respective cooking rooms 20. Thereby, the space of the cooking room 20 can be used in various ways according to a user's intention.

In the cooking room 20, a heater 22 may be disposed to heat food. In the current embodiment, the heater 22 may be an electric heater including an electric resistor. However, the heater 22 may be a gas heater to burn gas to generate heat. The oven 1 according to an embodiment of the present disclosure may include an electric oven and a gas oven.

In the rear part of the cooking room 20, a circulation fan 25 for circulating air in the cooking room 20 to heat food uniformly, and a circulation motor 24 for driving the circulation fan 25 may be disposed. In front of the circulation fan 25, a fan cover 26 may be disposed to cover the circulation fan 25. In the fan cover 26, an opening 27 may be formed to make air flow.

The door 40 may be hinge-coupled with the main body 10 at the lower part of the main body 10 in such a way to rotate with respect to the main body 10. However, the door 40 may be hinge-coupled with the main body 10 at the left or right side of the main body 10.

The door unit 40 may include a window 42 to enable a user to check the cooking process of food in the cooking room 20 from the outside of the oven 1. More specifically, the door 40 may include a door frame having an opening to enable the user to look at the inside of the cooking room 20, and the door frame may include a front frame 41a and a rear frame 41b. The front door frame 41a may include a front frame opening 41aa in which the window 42 is formed, and the rear door frame 41b may include a rear frame opening 41bb.

The door 40 may be provided with a plurality of panels 43 to insulate the inside of the cooking room 20. The plurality of panels 43 may be made of a transparent material such as glass to form the window 42 to enable the user to look at the inside of the cooking room 20. Accordingly, the plurality of panels 43 may be formed of any other transparent member, instead of glass.

The plurality of panels 43 may include a first panel 43a, a second panel 43b, a third panel 43c, and a fourth panel 43d arranged in a front-back direction. On a part of the first panel 43a disposed at the fore position, a masking portion 42a may be provided to cover the internal structure of the door 40 and to prevent light illuminating the inside of the cooking room 20 from being reflected from the internal structure of the door 40 and leaking out. More specifically, the masking portion 42a may be provided on the rear surface of the first panel 43a in such a way to surround the central portion forming the window 42. The masking portion 42a may be formed on the rear surface of the first panel 43a by a printing method or the like.

At the lower end of the door 40, a door inlet port 44 may be provided to inhale air into the inside of the door 40. Outside air flowed in from the lower end of the door 40 may move to the upper part of the door 40 to be heat exchanged with hot air transferred from the cooking room 20, and then discharged through a door outlet port 45 formed in the rear door frame 41b positioned in the rear part of the door 40. Through the configuration, the oven 1 can cool heat in the inside of the door 40 through the circulation of air.

At the upper end of the front part of the door 40, a handle 50 which the user can grip to easily open or close the door 40 may be provided. Meanwhile, if the door 40 is hinge-coupled with the main body 10 at the left or right side, the handle 50 may also be disposed at the left or right side of the front part of the door 40 accordingly.

The handle 50 may protrude in the front direction by a predetermined length from the front part of the door 40. That is, the handle 50 may include a pair of handle support portions 51 extending in the front direction from the front part of the door unit 40, and a handle extension portion 52 connecting the handle support parts 51 to each other.

Above the front part of the front panel 11, a display module 60 may be provided to display various operation information of the oven 1 and to enable the user to input operation commands. The display module 60 may be installed on a machine room cover 15.

Also, on the machine room cover 15, a manipulation unit 61 may be provided to additionally operate the oven 1.

The oven 1 may have a machine room 70 to accommodate electronic units for controlling operations of a variety of accessories including the display module 60. The machine room 70 may be positioned on the top of the cooking room 20. Between the machine room 70 and the cooking room 20, an insulating material 71 for insulating the machine room 70 from the cooking room 20 may be provided to prevent hot air from the cooking room 20 from being transferred to the machine room 70.

Also, the insulating material 71 may cover the entire outer surface of the cooking room 20 so as to prevent heat of the cooking room 20 from being transferring to the outside of the oven 1.

The oven 1 may have a cooling structure of cooling the machine room 70 by circulating air around the cooking room 20. The cooling structure of the oven 1 may include a cooling fan unit 72 to make air flow, and a cooling passage 73 to discharge air inhaled by the cooling fan unit 72 in the front direction from the oven 1.

That is, outside air may be inhaled into the machine room 70 through an opening 14a formed in the rear panel 14, and the air inhaled into the machine room 70 may flow in the inside of the machine room 70 to thus cool the electronic units, and then be finally discharged in the front direction from the oven 1 through a discharge opening 74 along the cooling passage 73.

A part of air in the cooking room 20 may be inhaled into the cooling path 73 through an outlet passage 75 and then discharged in the front direction from the oven 1. Also, a bypass hole 76 may be additionally formed to make a part of air flowing from the cooling passage 73 to the discharge opening 74 flow into the outlet passage 75. The bypass hole 76 may be opened or closed by a switch 77, and an amount of air of the cooking room 20 that is discharged to the outlet passage 75 may be adjusted by opening or closing the bypass hole 76.

Hereinafter, a light emitting member 100 disposed on the door 40 to illuminate the inside of the cooking room 20, and a guide member 200 to guide light emitted from the light emitting member 100 toward the cooking room 20 will be described in detail.

Figure 4:
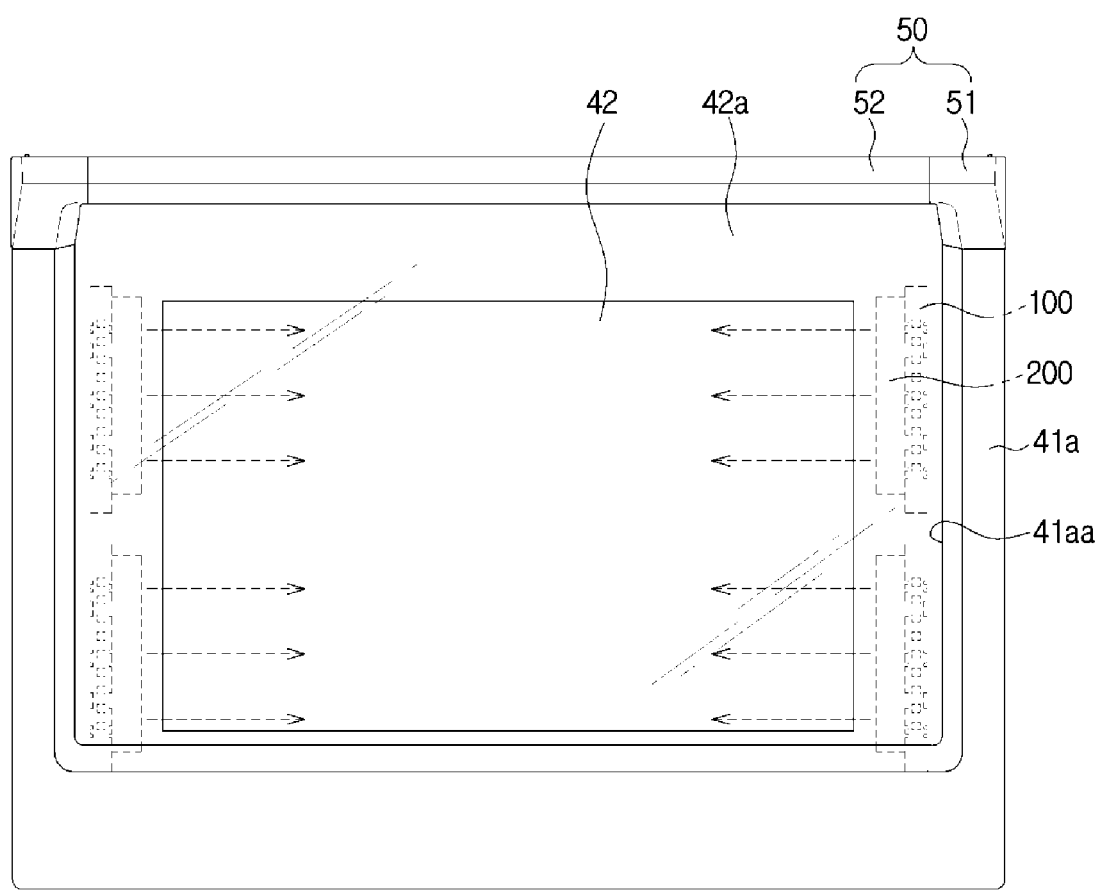
FIG. 4 is a schematic view showing a plurality of light emitting members and a plurality of guide members arranged at the left and right portions of a door of the oven according to an embodiment of the present disclosure.
Figure 5:
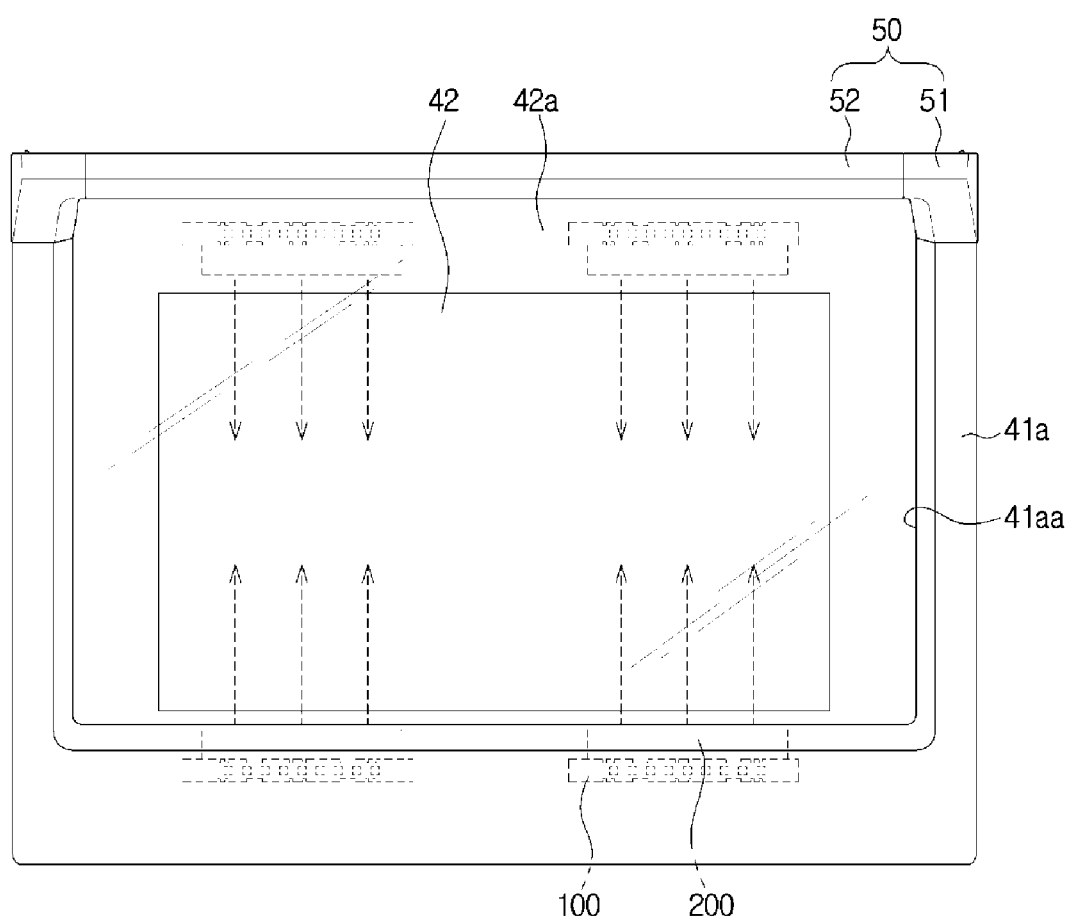
FIG. 5 is a schematic view showing a plurality of light emitting members and a plurality of guide members arranged at the upper and lower portions of the door of the oven according to an embodiment of the present disclosure.

FIG. 4 is a schematic view showing a plurality of light emitting members and a plurality of guide members arranged at the left and right sides of a door of the oven according to an embodiment of the present disclosure, and FIG. 5 is a schematic view showing a plurality of light emitting members and a plurality of guide members arranged at the upper and lower sides of the door of the oven according to an embodiment of the present disclosure.

Referring to FIGS. 4 and 5, the light emitting member 100 and the guide member 200 may be disposed at at least one of the left side, right side, upper side, and lower side of the window 42 provided in the door 40. The light emitting member 100 and the guide member 200 may be covered by the masking portion 42a or the front frame 41a.

As shown in FIG. 4, a light emitting member 100 and a guide member 200 may be disposed at at least one of the left and right sides of the window 42 provided in the door 40. The light emitting member 100 and the guide member 200 may also be disposed at at least one of the lower portion of the left side, the upper portion of the left side, the lower portion of the right side, and the upper portion of the right side of the window 42.

When a separate light is provided in the inside of the cooking room 20, the light emitting member 100 and the guide member 200 disposed in the door 40 may be arranged to illuminate the entire inside of the cooking room 20 together with an internal light of the cooking room 20. For example, if the internal light of the cooking room 20 is disposed to illuminate the upper space of the cooking room 20, the light emitting member 100 and the guide member 200 disposed at the left or right side of the door 40 may be disposed to illuminate the lower space of the cooking room 20.

Meanwhile, if a plurality of light emitting members 100 and a plurality of guide members 200 are vertically arranged on at least one of the left and right sides of the door, the plurality of light emitting members 100 may be controlled to selectively illuminate food placed in the upper and lower space divided by the rack 23 in the cooking room 20. Even when a single light emitting member 100 and a single guide member 200 are disposed at at least one of the left and right sides of the door, the light emitting member 100 may be controlled to selectively illuminate food placed in the upper and lower space As shown in FIG. 5, the light emitting member 100 and the guide member 200 may be disposed at at least one of the upper and lower sides of the window 42 provided in the door 40. When the light emitting member 100 and the guide member 200 are disposed at the upper and lower sides of the door 40, the light emitting member 100 may be controlled to selectively illuminate food placed in the upper and lower space by the rack 23 inside the cooking room 20.

Also, the light emitting member 100 and the guide member 200 may be disposed on at least one of the left portion of the upper side, the right portion of the upper side, the left portion of the lower side, and the right portion of the lower side of the window 42. When a separate light is provided inside the cooking room 20, the light emitting member 100 and the guide member 200 disposed in the door 40 may be arranged to illuminate the entire inside of the cooking room 20 together with the internal light of the cooking room 20. For example, if the internal light of the cooking room 20 is disposed to illuminate the left space of the cooking room 20, the light emitting member 100 and the guide member 200 disposed at the upper or lower side of the door 40 may be disposed to illuminate the right space of the cooking room 20.

Although not shown in the drawings, the light emitting member 100 and the guide member 200 may be disposed according to any combination of the positions shown in FIGS. 4 and 5.

Hereinafter, an internal structure of the door 40 when the light emitting member 100 and the guide member 200 are disposed at the left and right sides of the window 42 provided in the door 40 will be described.

Figure 6:
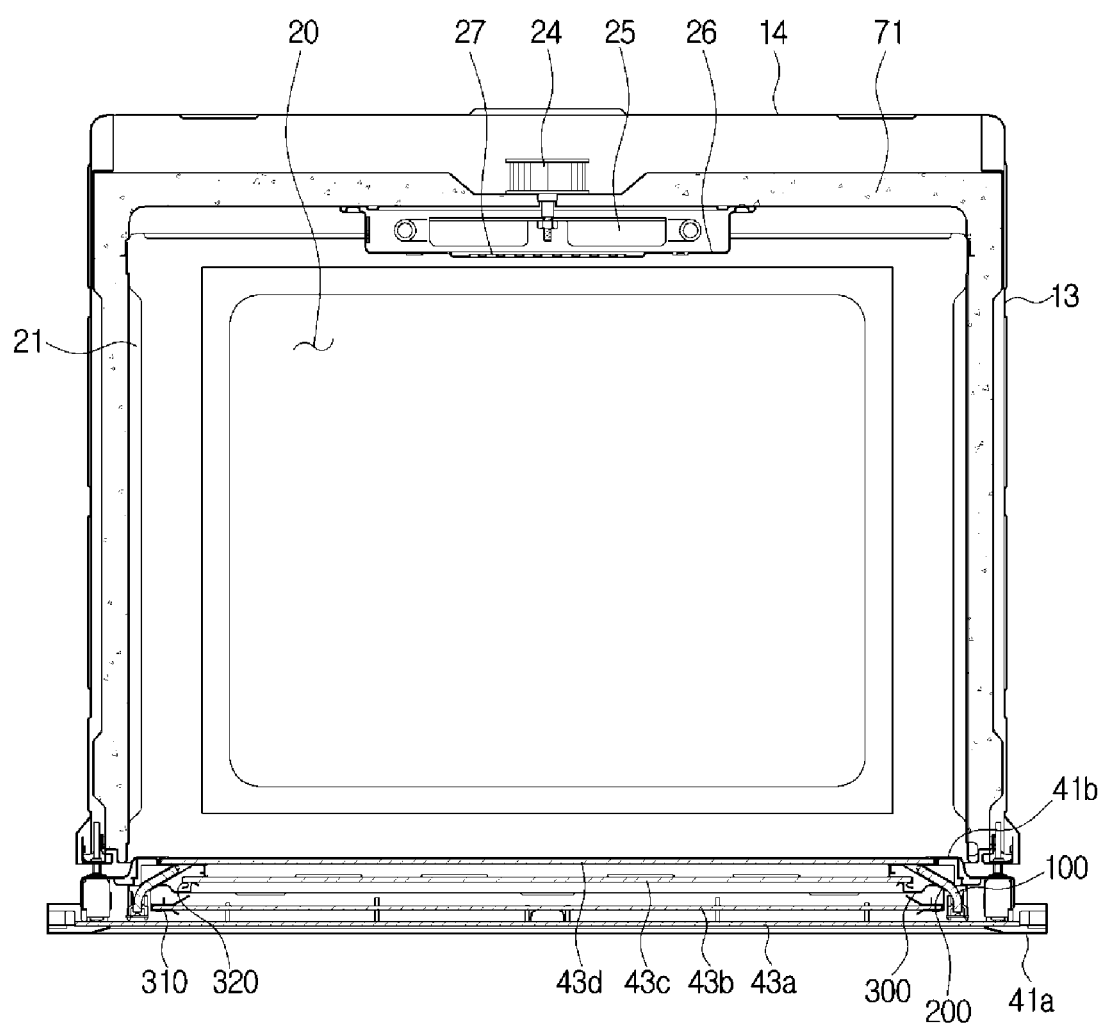
FIG. 6 is a horizontal cross-sectional view of an oven according to an embodiment of the present disclosure.
Figure 7:
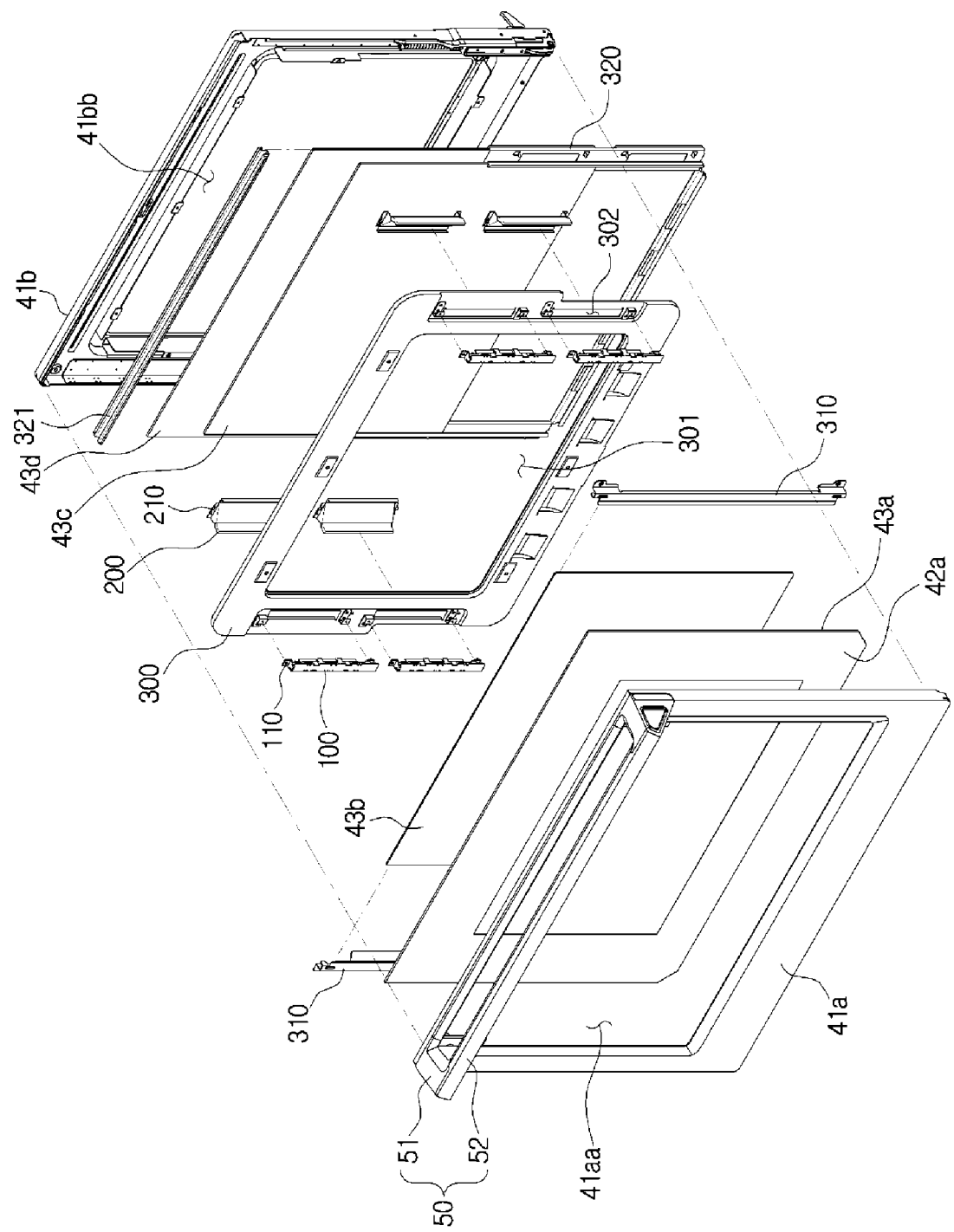
FIG. 7 is an exploded perspective view of a door of the oven according to an embodiment of the present disclosure.

FIG. 6 is a horizontal cross-sectional view of an oven according to an embodiment of the present disclosure, and FIG. 7 is an exploded perspective view of a door of the oven according to an embodiment of the present disclosure.

Referring to FIGS. 6 and 7, the door 40 may include a middle frame 300 supporting structures disposed inside the door. The middle frame 300 may include an opening 301 forming the window 42 at the center.

The first panel 43a may be fixed on the front frame 41a, and the second panel 43b may be fixed on the front surface of the middle frame 300 by a first fixing member 310. The first fixing member 310 may be coupled with the left and right ends of the second panel 43b in an interference fit manner, and may be coupled with the middle frame 300 by a separate fastening member.

The third panel 43c and the fourth panel 43d may be inserted into a second fixing member 320 surrounding the left, right, upper, and lower ends of the third panel 43c and the fourth panel 43d, and the upper ends of the third panel 43c and the fourth panel 43d may be covered with a third fixing member 321 and fixed at the rear surface of the middle frame 300.

The light emitting member 100 and the guide member 200 may also be fixed at the middle frame 300. The light emitting member 100 may be supported by the first support member 110, and fixed on the front surface of the middle frame 300. The middle frame 300 may have an opening 302 at the fixing position of the light emitting member 100 to transmit light from the light emitting member 100 therethrough. The guide member 200 may pass through the opening 302 provided in the middle frame 300. One side of the guide member 200 on which an incident surface 203 (see FIG. 8) of the guide member 200 is formed may be supported by the first support member 110 and the other side of the guide member 200 on which an emitting surface 204 (see FIG. 8) of the guide member 200 is formed may be supported by the second support member 210. The second support member 210 may be fixed on the rear surface of the middle frame 300.

The light emitting member 100 may include a light emitting element 101 (see FIG. 8), and a Printed Circuit Board (PCB) 102 (see FIG. 8) on which the light emitting element 101 (see FIG. 8) is mounted. In the light emitting member 100, a plurality of light emitting elements 101 may be mounted in a line on the PCB 102 extending in the longitudinal direction. The light emitting elements 101 may be Light Emitting Diodes (LEDs) that may have various colors. Also, the illumination color of the light emitting member 100 may be controlled.

The guide member 200 may be provided as a solid member whose inside is filled, and may be provided as a plate member extending in the longitudinal direction to correspond to the length of the PCB 102 of the light emitting member 100.

Figure 8:
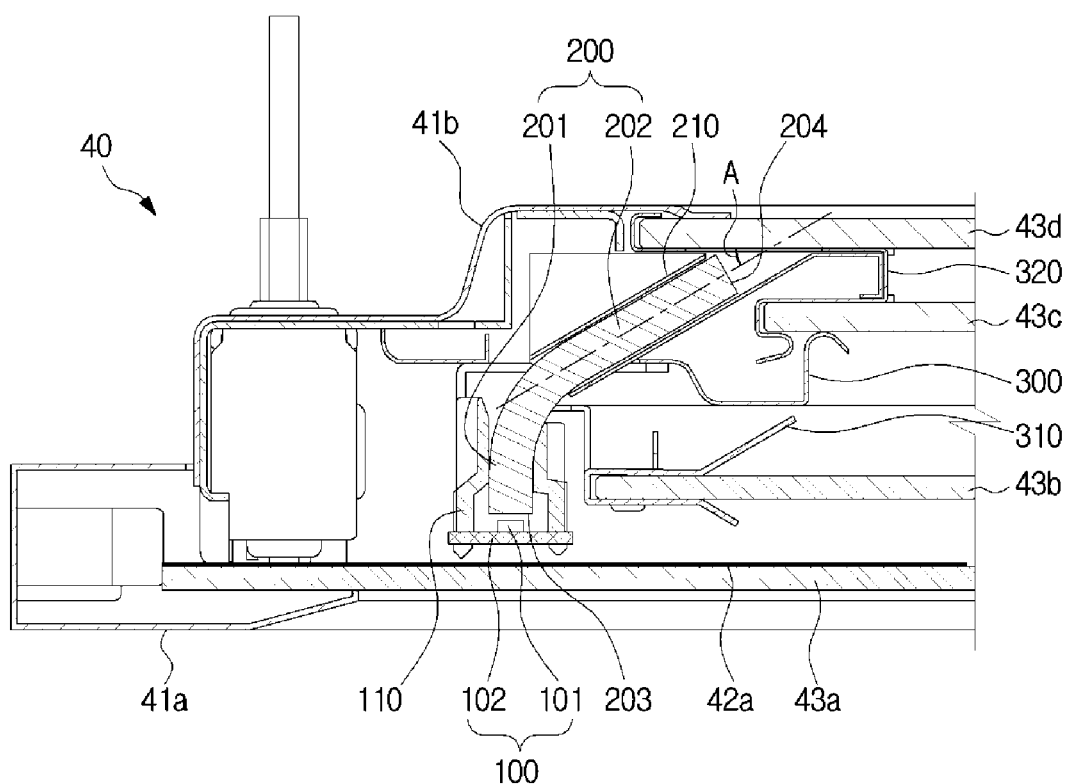
FIG. 8 is an enlarged view showing a part of the horizontal cross section of a door of an oven in which a solid guide member according to an embodiment of the present disclosure is disposed.
Figure 9:
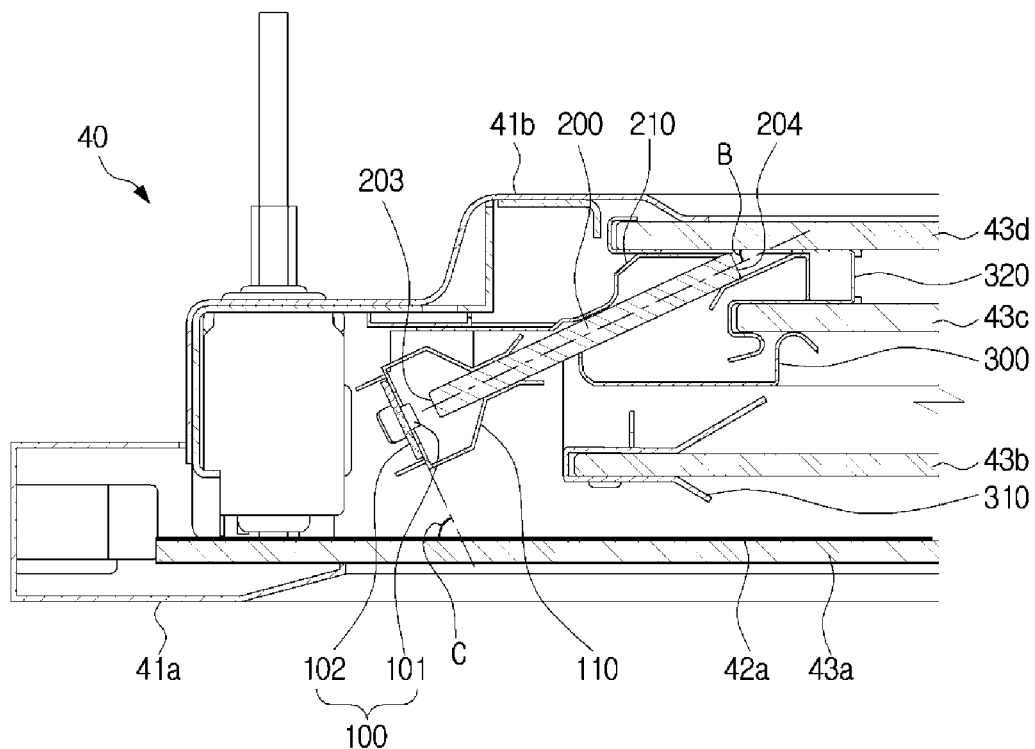
FIG. 9 is an enlarged view showing a part of the horizontal cross section of a door of an oven in which a solid guide member according to an embodiment of the present disclosure is disposed.
Figure 10:
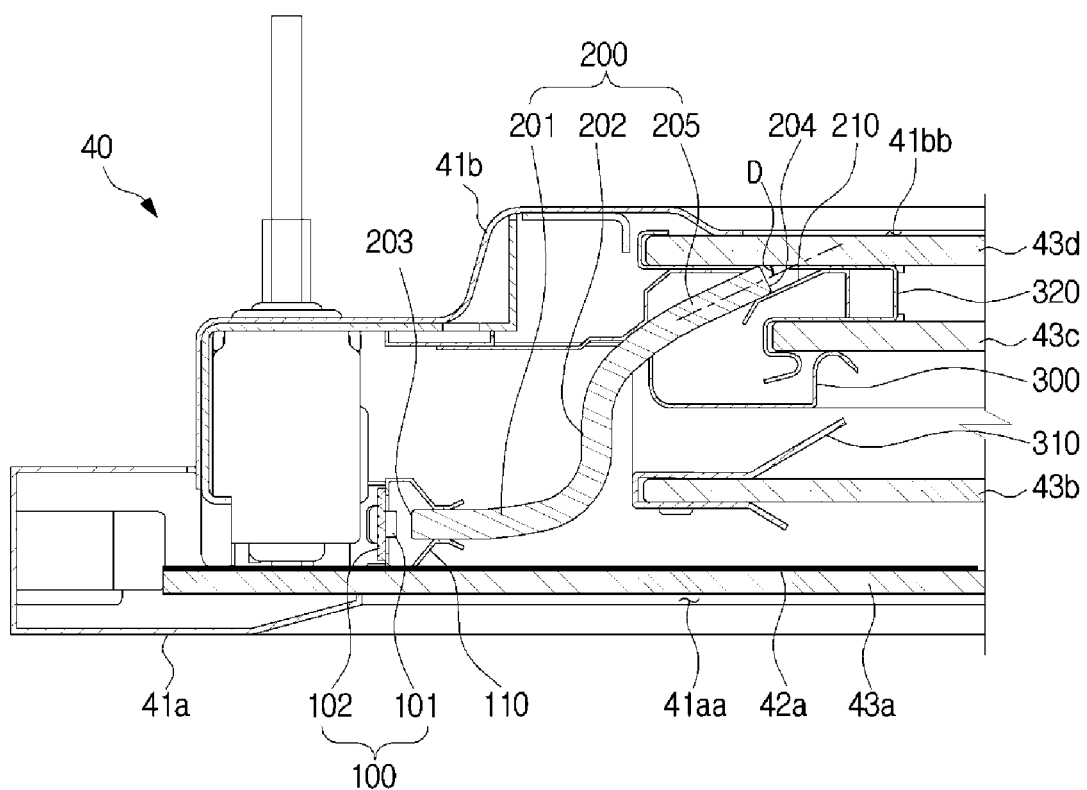
FIG. 10 is an enlarged view showing a part of the horizontal cross section of a door of an oven in which a solid guide member according to an embodiment of the present disclosure is disposed.

FIG. 8 is an enlarged view showing a part of the horizontal cross section of a door of an oven in which a solid guide member according to an embodiment of the present disclosure is disposed, FIG. 9 is an enlarged view showing a part of the horizontal cross section of a door of an oven in which a solid guide member according to an embodiment of the present disclosure is disposed, and FIG. 10 is an enlarged view showing a part of the horizontal cross section of a door of an oven in which a solid guide member according to an embodiment of the present disclosure is disposed.

Referring to FIG. 8, the guide member 200 may include a first portion 201 extending from the incident surface 203 in a first direction, and a second portion 202 bent from the first portion 201 and extending in a second direction. The emitting surface 204 may be provided at one end of the second portion 202. That is, the guide member 200 may be formed as a plate-shaped member which has a bent portion and whose cross section is curved.

Light emitted from the light emitting member 100 may be incident vertically to the incident surface 203 of the guide member 200. Accordingly, in the light emitting member 100, the PCB 102 may be disposed to be perpendicular to the incident surface 203 of the guide member 200.

Since the cooking room 20 maintains a temperature of about 200 degrees during cooking, the light emitting member 100 may be damaged by heat if it is located adjacent to the cooking room 20. Therefore, the light emitting member 100 may be disposed adjacent to the first panel 43a as close as possible.

The light emitting member 100 may be disposed in parallel to the plurality of panels 43. That is, the light emitting member 100 may be disposed parallel to the window 42 of the door 40. The first portion 201 of the guide member 200 may extend in the first direction that is perpendicular to the window 42, and the second portion 202 may extend in the second direction that forms an angle A of 0 to 90 degrees with respect to the window 42.

Referring to FIG. 9, the guide member 200 may be formed as a plate member having no bent portion. That is, the guide member 200 may be formed as a plate member having a straight cross section.

Light emitted from the light emitting member 100 may be incident vertically to the incident surface 203 of the guide member 200. Accordingly, in the light emitting member 100, the PCB 102 may be disposed to be perpendicular to the incident surface 203 of the guide member 200.

In the light emitting member 100, the PCB 102 may form an angle C of 0 to 90 degrees with respect to the window 42 of the door 40, and the guide member 200 may form an angle B of 0 to 90 degrees with respect to the window 42. The guide member 200 provided as a plate member having no bent portion may minimize the loss of light from the light emitting member 100.

Referring to FIG. 10, the guide member 200 may include a first portion 201 extending in a first direction from the incident surface 203, a second portion 202 bent from the first portion 201 and extending in a second direction, and a third portion 205 bent from the second portion 202 and extending in a third direction. The emitting surface 204 may be provided at one end of the third portion 205. Although not shown in the drawings, the guide member 200 may be formed as a plate member which has two or more bent portions and whose cross section is in the shape of a free curve.

Light emitted from the light emitting member 100 may be incident vertically to the incident surface 203 of the guide member 200. Thus, in the light emitting member 100, the PCB 102 may be disposed to be perpendicular to the incident surface 203 of the guide member 200.

Since the cooking room 20 maintains a temperature of about 200 degrees during cooking, the light emitting member 100 may be damaged by heat if it is disposed adjacent to the cooking room 20. Therefore, the light emitting member 100 may be disposed adjacent to the first panel 43a as close as possible.

The light emitting member 100 may be disposed to be perpendicular to the plurality of panels 43. That is, the light emitting member 100 may be perpendicular to the window 42 of the door 40. The first portion 201 of the guide member 200 may extend in the first direction that is parallel to the window 42, and the third portion 205 may extend in the third direction that forms an angle D of 0 to 90 degrees with respect to the window 42.

Since the guide member 200 having a curved cross section can set the first direction to the third direction according to the position of the light emitting member 100, the light emitting member 100 can be disposed at any position in the door 40.

Meanwhile, by changing the cross section of the incident surface 203 and the emitting surface 204 of the guide member 200 to various forms, it is possible to facilitate arrangement of the light emitting member 100 and the guide member 200, and to increase the transmission efficiency of the guide member 200.

Figure 11:
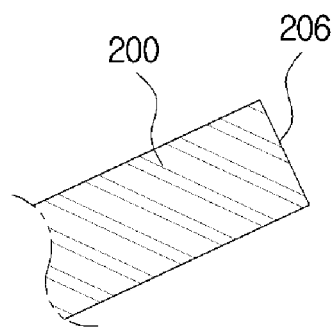
FIG. 11 is a view illustrating the cross section of an incident surface or an emitting surface of a guide member of the oven according to an embodiment of the present disclosure.
Figure 11:
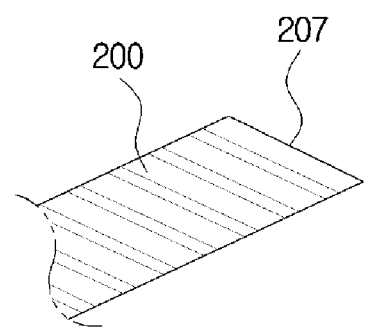
Figure 11:
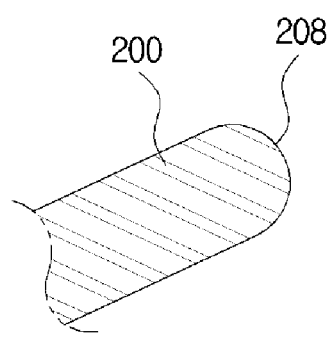
Figure 11:
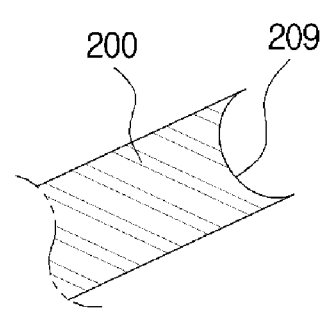

FIG. 11 is a view illustrating the cross section of an incident surface or an emitting surface of a guide member of the oven according to an embodiment of the present disclosure.

In FIG. 11, part (a) shows an incident surface 203 or an emitting surface 204 provided in the form of a flat plane 206, part (b) shows an incidence surface 203 or an emitting surface 204 provided in the form of an inclined surface 207, part (c) shows an incident surface 203 or an emitting surface 204 provided in the form of a convex surface 208, and part (d) shows an incident surface 203 or an emitting surface 204 provided in the form of a concave surface 209.

The incident surface 203 or the emitting surface 204 provided in the form of the inclined surface 207 may change the incidence direction and the emission direction of light so that the arrangement direction of the light emitting members 100 and the arrangement direction of the guide member 200 may change by appropriately changing the shape of the cross section of the incident surface 203 and the emitting surface 204.

The incident surface 203 provided in the form of the convex surface 208 may disperse incident light, and the emitting surface 204 provided in the form of the convex surface 208 may concentrate emitted light. In addition, the incident surface 203 provided in the form of the concave surface 209 may concentrate incident light, and the emitting surface 204 provided in the form of the convex surface 208 may disperse emitted light. Therefore, the light transmission efficiency of the guide member 200 may increase by appropriately changing the shape of the cross section of the incident surface 203 and the emitting surface 204.

The light transmitting efficiency of the guide member 200 may increase by performing various surface treatments on the emitting surface 204 of the guide member 200.

Figure 12:
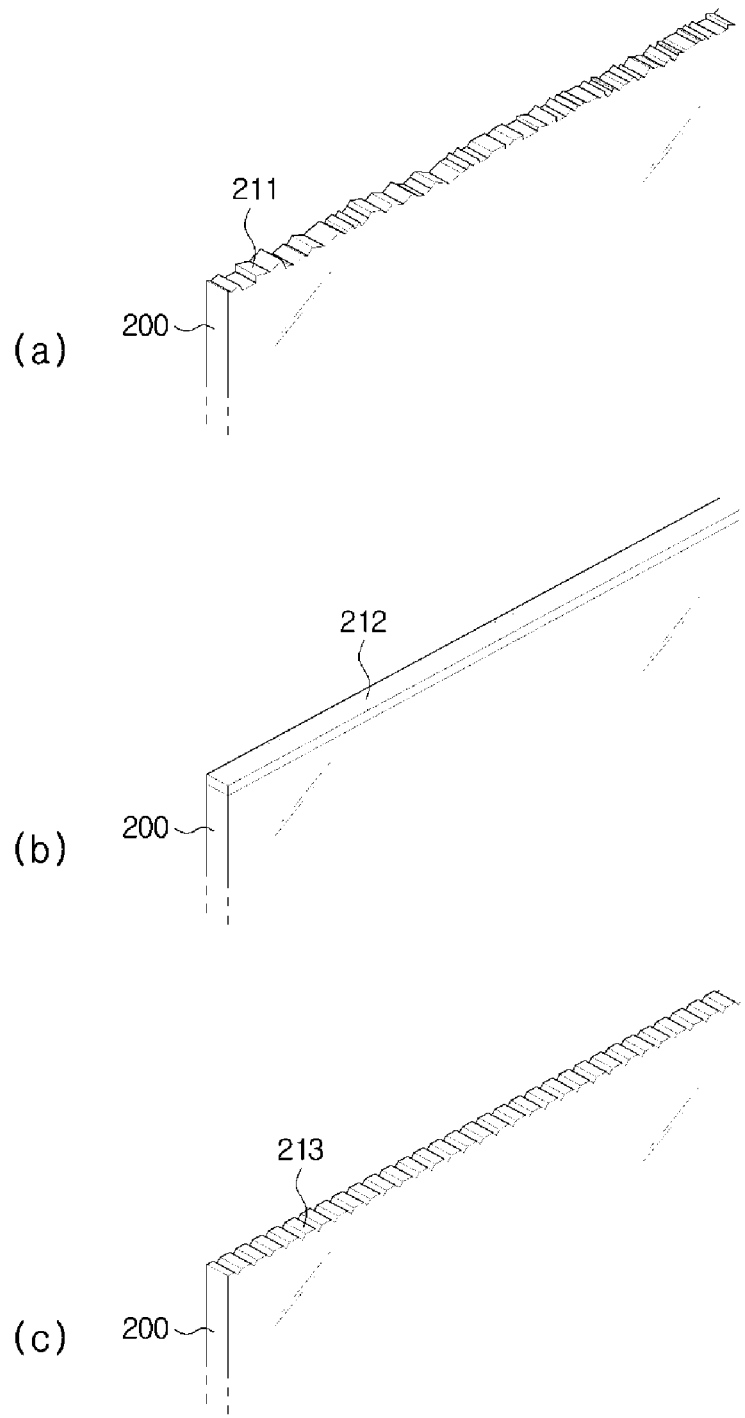
FIG. 12 is a view illustrating the cross section of an emitting surface of a guide member of an oven according to an embodiment of the present disclosure.

FIG. 12 is a view illustrating the cross section of an emitting surface of a guide member of an oven according to an embodiment of the present disclosure.

In FIG. 12, part (a) shows an emitting surface 204 in the form of an irregular bumpy surface 211, part (b) shows an emitting surface 204 on which a printed surface 212 is provided, and part (c) shows an emitting surface 204 in the form of a regular bumpy surface 213.

The irregular bumpy surface 211 may be formed in the emitting surface 204 by etching or the like, and the printed surface 212 may be formed by printing a certain pattern or irregular pattern in the emitting surface. The regular bumpy surface 212 may be formed in the emitting surface by carving. The emitting surface 204 may appropriately include one or more of the irregular bumpy surface 211, the regular bumpy surface 213, and the printed surface 212 so that emitted light may be efficiently dispersed to increase the light transmission efficiency of the guide member 200.

The guide member 200 according to an embodiment of the present disclosure may be provided not only as a solid member whose inside is filled, but also as a hollow member 220 whose inside is empty. Also, the guide member 200 provided as the hollow member 220 may be formed as a plate member having no bent portion and having a straight cross-section, like a guide member provided with a solid member, or as a plate member having a bent portion and having a curved cross-section.

Figure 13:
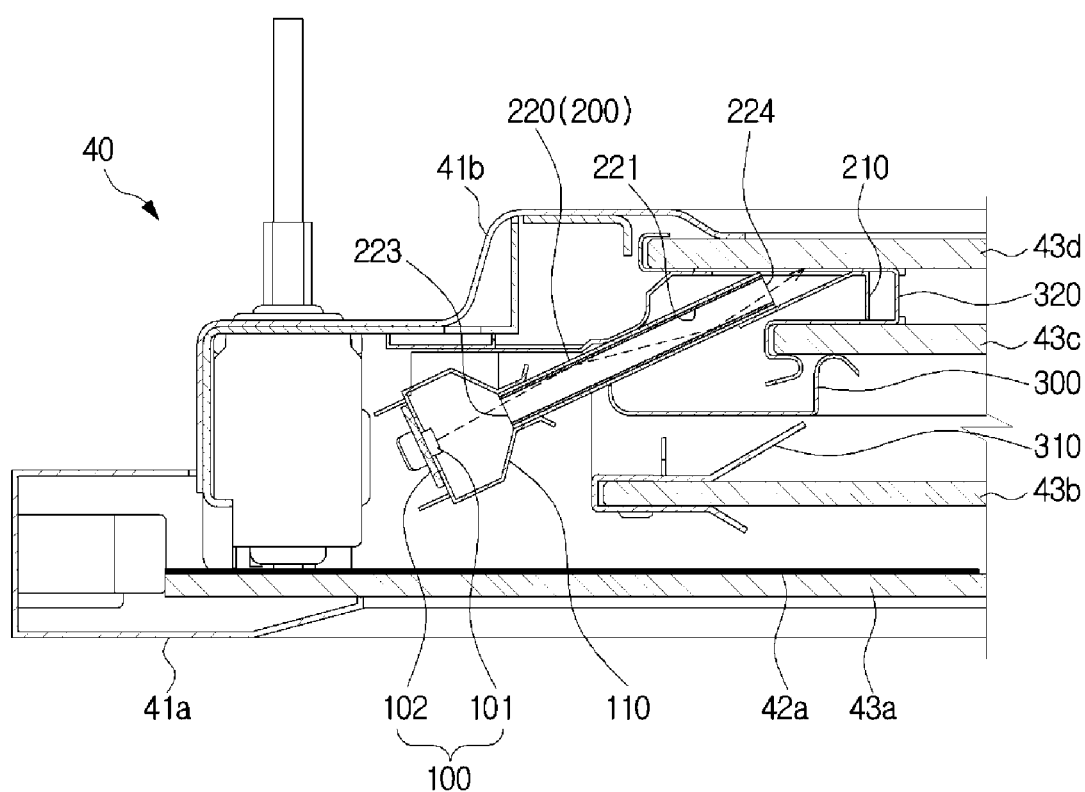
FIG. 13 is an enlarged view showing a part of the horizontal cross section of a door of an oven in which a hollow guide member according to an embodiment of the present disclosure is disposed.

FIG. 13 is an enlarged view showing a part of the horizontal cross section of a door of an oven in which a hollow guide member according to an embodiment of the present disclosure is disposed.

Referring to FIG. 13, the guide member 200 may be formed as a hollow member 220 whose inside is empty. The hollow member 220 may be formed of a reflective material, or may have a reflective surface 221 therein so that light incident to the incident end 223 can be transmitted to the emitting end 224 by total reflection. Other internal configurations of the door 40 may be the same as the internal configurations of the door 40 as shown in FIGS. 8 to 10, according to the shape of the guide member 200.

The guide member 200 according to an embodiment of the present disclosure may be a solid member having a straight cross section to be disposed in parallel to the window 42. Also, one of the plurality of panels 43 constituting the window 42 may be used as the guide member 200.

Figure 14:
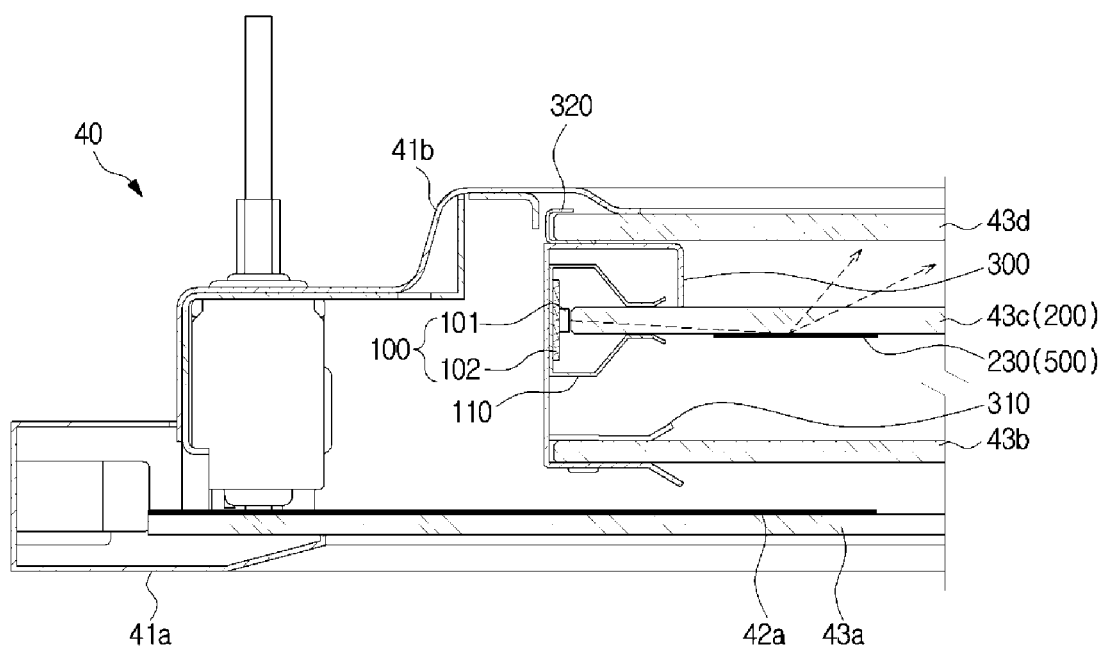
FIG. 14 is an enlarged view showing a part of the horizontal cross section of a door of an oven in which a light emitting member according to an embodiment of the present disclosure is disposed on one portion of a panel forming a window.

FIG. 14 is an enlarged view showing a part of the horizontal cross section of a door of an oven in which a light emitting member according to an embodiment of the present disclosure is disposed on one portion of a panel forming a window.

Referring to FIG. 14, since one panel of the plurality of panels 43 is used as the guide member 200, a supporting member for supporting one end of the guide member 200 may be omitted. The panel used as the guide member 200 may be a second panel 43b or a third panel 43c. When the third panel 43c is used as the guide member 200, light emitted through the third panel 43c can enter the cooking room 20 only via the fourth panel 43d, resulting in high light efficiency.

The light emitting member 100 may be disposed on the side end of the third panel 43c so that light can be incident to the third panel 43c used as the guide member 200. The guide member 200, that is, the third panel 43c may include a reflecting surface 230 configured to refract light incident from the light emitting member 100 toward the cooking room 20, since the light incident from the light emitting member 100 to the third panel 43c need to be emitted toward the cooking room 20.

The reflecting surface 230 may be disposed adjacent to the light emitting member 100. That is, the reflecting surface 230 may be provided on one portion of the third panel 43c to correspond to the portion where the light emitting member 100 is disposed. The reflecting surface 230 may be formed in the front surface of the third panel 43c by printing or the like such that it does not deviate from the masking portion 42a formed on the rear surface of the first panel 43a.

The guide member 200 according to an embodiment of the present disclosure may be formed in the form of a reflecting plate 240.

Figure 15:
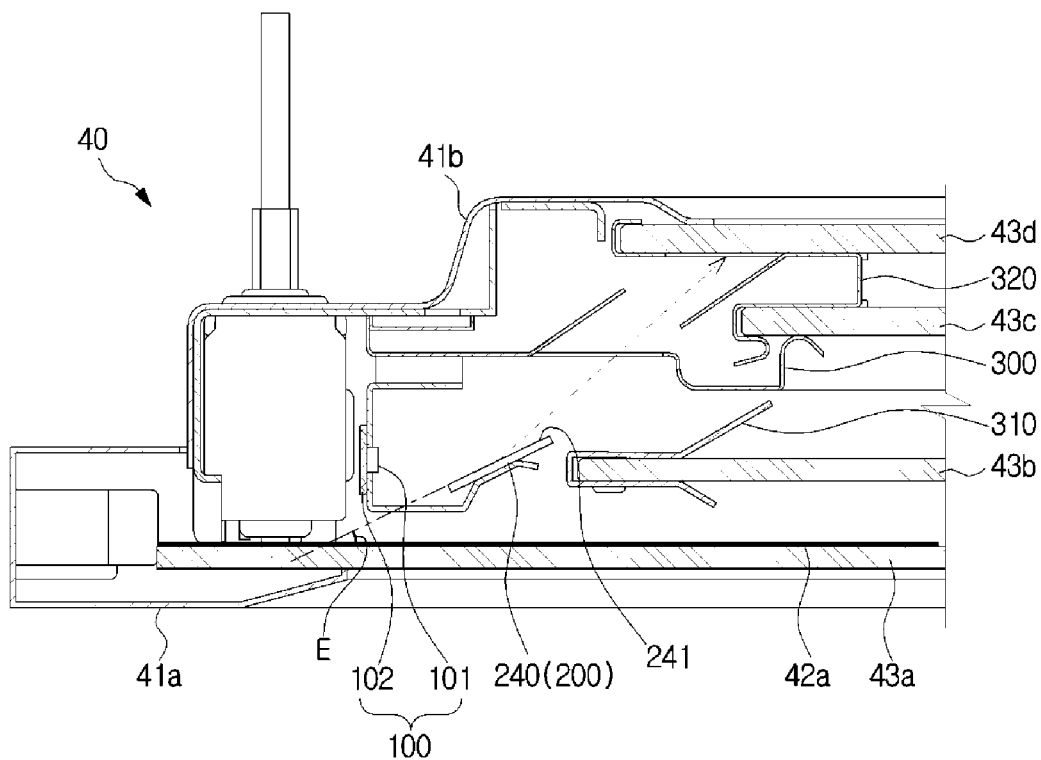
FIG. 15 is an enlarged view showing a part of the horizontal cross section of a door of an oven in which a guide member according to an embodiment of the present disclosure includes a reflecting plate.

FIG. 15 is an enlarged view showing a part of the horizontal cross section of a door of an oven in which a guide member according to an embodiment of the present disclosure includes a reflecting plate.

Referring to FIG. 15, the guide member 200 may be provided in the form of a reflecting plate 240. The reflecting plate 240 may be formed of a material capable of reflecting light from the light emitting member 100, or may include a reflecting surface 241 formed of a reflective material.

The reflecting plate 240 may be disposed adjacent to the light emitting member 100. Also, the reflecting plate 240 may be supported on a first support member 110 supporting the light emitting member 100. Therefore, the second supporting member for supporting one end of the guide member 200 may be omitted.

The internal structure of the door 40 may change appropriately depending on the positions of the light emitting member 100 and the reflecting plate 240. The light emitting member 100 may be disposed to be perpendicular to the window 42, and the reflecting plate 240 may be disposed to have an angle E that is greater than 0 degrees and smaller than 90 degrees with respect to the window 42, in order to reflect light from the light emitting member 100 toward the cooking room 20.

The light emitting member 100 according to an embodiment of the present disclosure may be disposed inside the handle 50 of the door 40.

Figure 16:
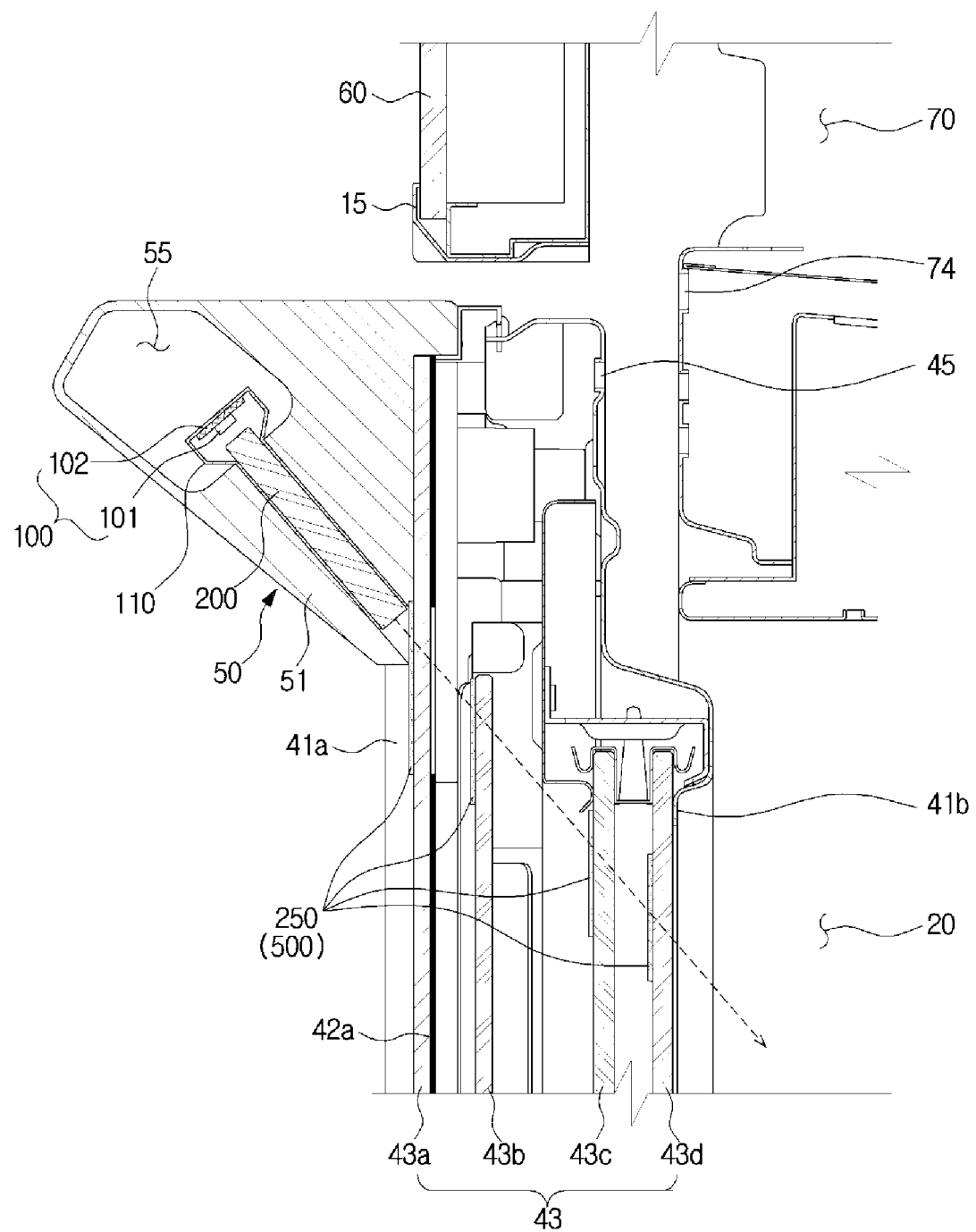
FIG. 16 is an enlarged view showing a part of the side cross section of an oven in which a light emitting member is disposed on a handle of a door according to an embodiment of the present disclosure.
Figure 17:
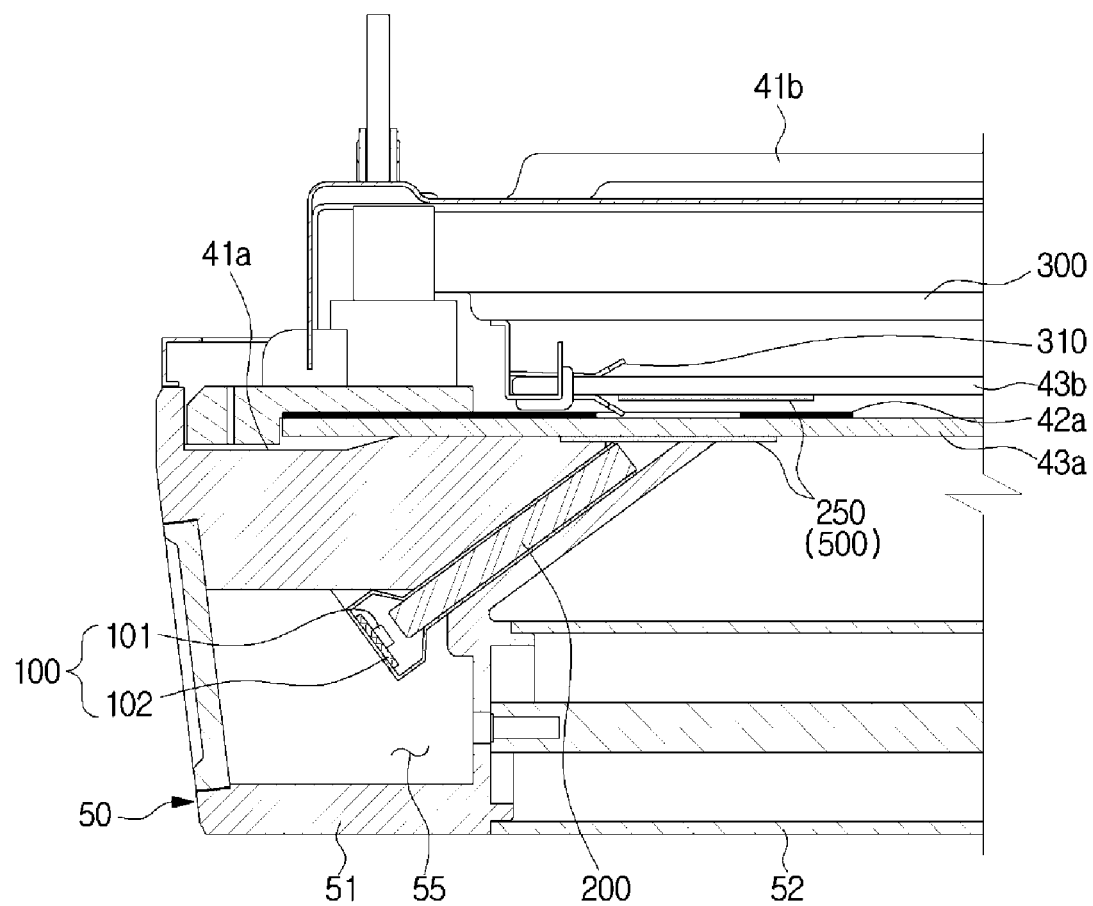
FIG. 17 is an enlarged view showing a part of the horizontal cross section of a door of an oven in which a light emitting member is disposed on a handle of the door according to an embodiment of the present disclosure.

FIG. 16 is an enlarged view showing a part of the side cross section of an oven in which a light emitting member is disposed on a handle of a door according to an embodiment of the present disclosure, and FIG. 17 is an enlarged view showing a part of the horizontal cross section of a door of an oven in which a light emitting member is disposed on a handle of the door according to an embodiment of the present disclosure.

Referring to FIGS. 16 and 17, the light emitting member 100 and the guide member 200 may be installed inside the handle 50 in such a way to face the cooking room 20. More specifically, the light emitting member 100 and the guide member 200 may be disposed in the inner space 55 of the handle support 51 provided on both the left and right sides of the handle 50. One end of the guide member 200 may be supported by a support member 110 supporting the light emitting member 100.

Since the handle 50 is provided in front of the masking portion 42a formed on the first panel 43a, the masking portion 42a may be partially removed so that light passed through the guide member 200 can pass through the inside of the door 40. An anti-reflective coating portion 250 may be provided on a part of the plurality of panels 43 so that light passed through the guide member 200 may efficiently pass through the plurality of panels 43 forming the window 42 without being reflected.

Since the light emitting member 100 is disposed on the handle 50 so as to be spaced apart from the cooking room 20, the light emitting member may be prevented from being damaged by heat generated in the cooking room 20. Although not shown in the drawings, the light emitting member 100 and the guide member 200 may be disposed on the handle extension 52.

The light emitting member 100 according to an embodiment of the present disclosure may be detachably attached on the outer surface of the window 42 of the door 40.

Figure 18:
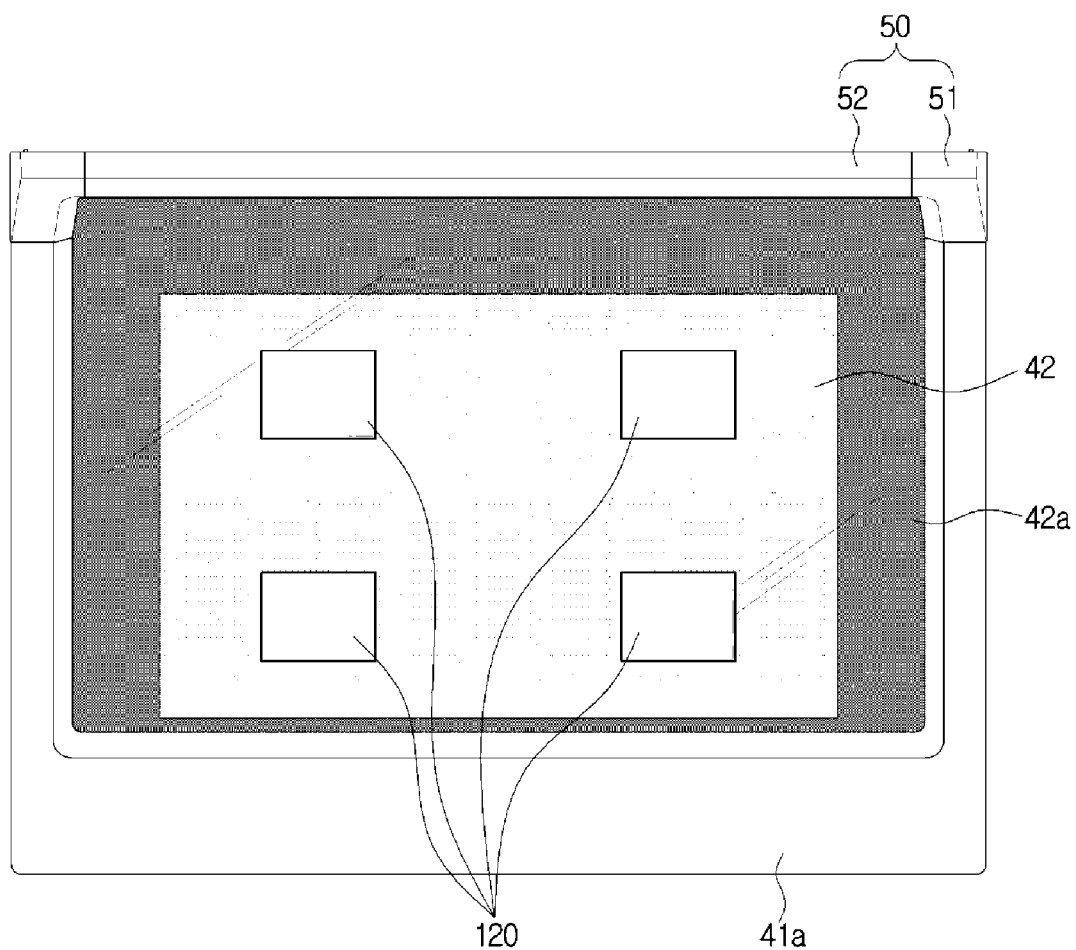
FIG. 18 is a front view of a door of an oven in which an illuminating device according to an embodiment of the present disclosure is attached on the outer surface of the door.
Figure 19:
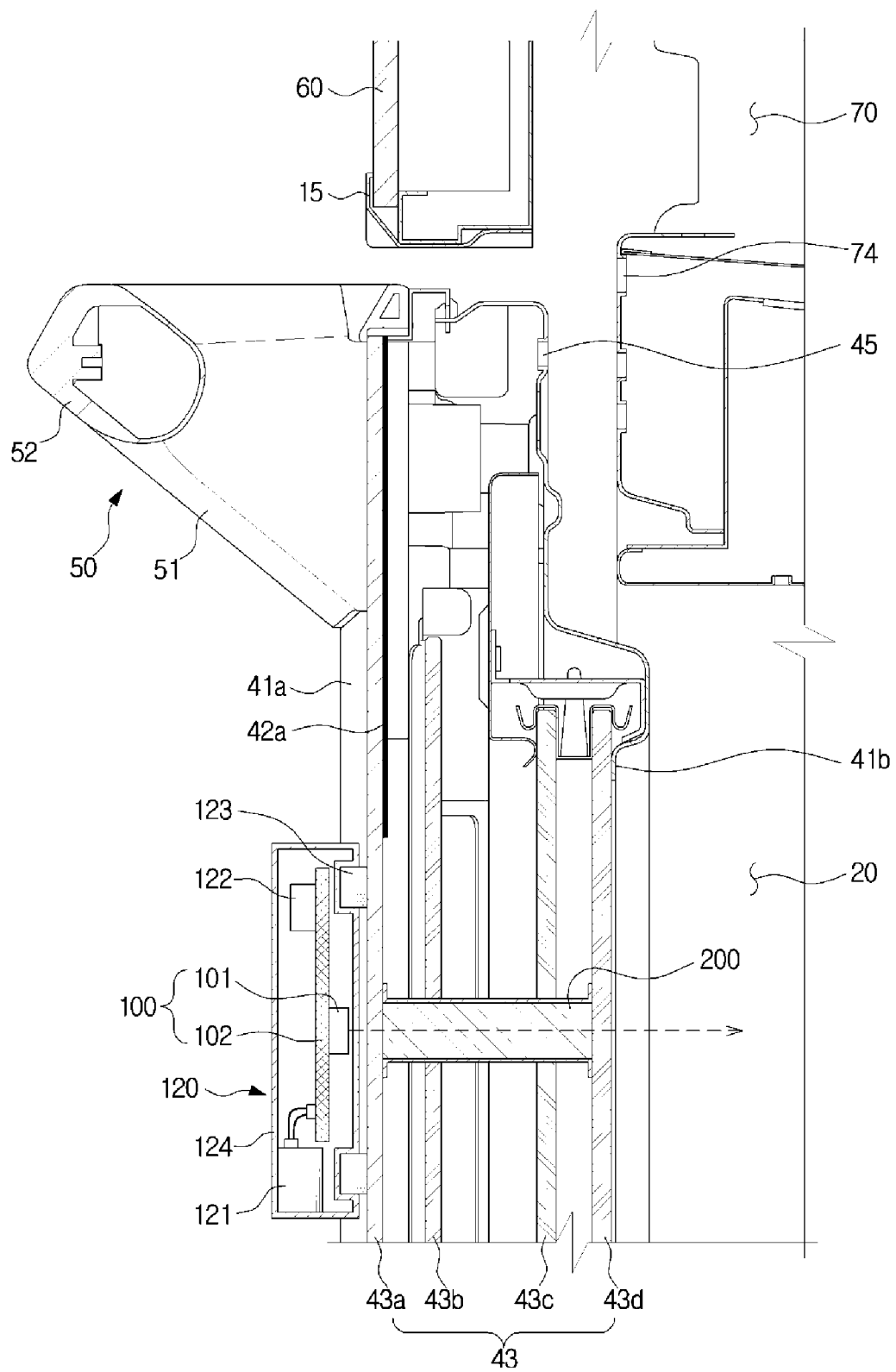
FIG. 19 is an enlarged view showing a part of a side cross section of the oven in which the illuminating device according to an embodiment of the present disclosure is attached on the outer surface of the door.

FIG. 18 is a front view of a door of an oven in which an illuminating device according to an embodiment of the present disclosure is attached on the outer surface of the door, and FIG. 19 is an enlarged view showing a part of a side cross section of the oven in which the illuminating device according to an embodiment of the present disclosure is attached on the outer surface of the door.

Referring to FIGS. 18 and 19, an illuminating device 120 having a light emitting member 100 may be attached at a plurality of positions on the outer surface of the window 42 of the door 40. The illuminating device 120 may include a case having a light emitting member 100, a power source 121 to supply power to the light emitting member 100, and a transceiver 122 configured to receive/transmit signals from/to the main body 10. In addition, the illuminating device 120 may include an attaching member 123 to attach the case 124 on the outer surface of the window 42.

A guide member 200 may be disposed at a predetermined position inside the door 40 on which the illuminating device 120 is attached. The guide member 200 may penetrate a part of the plurality of panels 43 constituting the window 42.

The door 40 of the oven 1 according to an embodiment of the present disclosure may include the light emitting member 100 to illuminate the cooking room 20, the window 42 to enable a user to look at the inside of the cooking room 20, and a panel 43 constituting the window 42, wherein the panel 43 has a guide portion (500, see FIGS. 14, 16, 17 and 20) configured to guide light from the light emitting member 100 toward the cooking room 20.

Referring to FIG. 14, the door 40 may be provided with a light emitting member 100 disposed on at least one of the left, right, upper, and lower portions of at least one panel of the plurality of panels 43. Light from the light emitting member 100 may be guided toward the cooking room 20 by the guide portion 500 provided on at least one of the panels without a separate guide member.

As described above, one of the plurality of panels 43 constituting the window 42 may be used as the guide member 200. Light incident to at least one panel from the light emitting member 100 may be guided toward the cooking room 20 by the guide portion 500 provided on at least one of the plurality of panels 43. That is, the reflecting surface 230 shown in FIG. 14 may be the guide portion 500 provided on at least one of the plurality of panels 43.

Referring to FIGS. 16 and 17, a guide portion 500 according to an embodiment of the present disclosure may be an anti-reflective coating portion 250 configured to pass light from the light emitting member 100 without reflecting it. Although not shown in the drawings, when the light emitting member 100 is disposed at the handle extension 52, or when no separate guide member 200 is provided, the anti-reflective coating portion 250 provided on at least one of the plurality of panels 43 may guide light from the light emitting member 100 toward the cooking room 20.

Figure 20:
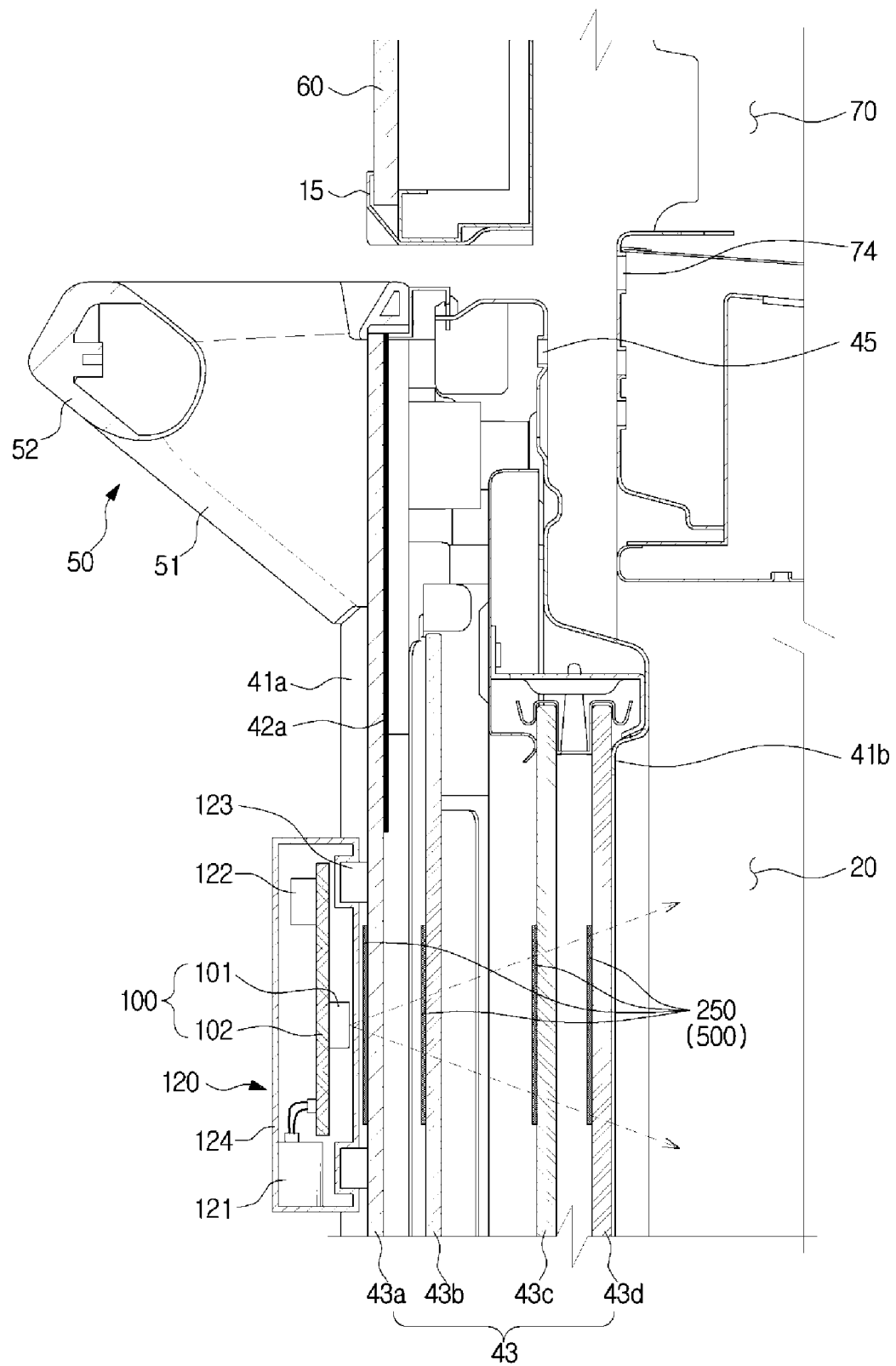
FIG. 20 is an enlarged view showing a part of a side cross section of the oven in which the illuminating device according to an embodiment of the present disclosure is attached on the outer surface of the door.

Referring to FIGS. 18 and 20, like the embodiment shown in FIGS. 16 and 17, the guide portion 500 may be an anti-reflective coating portion 250 configured to pass light from the light emitting member 100 without reflecting it.

At least one panel of the plurality of panels 43 may include a plurality of guide portions 500 and the illuminating device 120 in which the light emitting member 100 is disposed may attached at a position corresponding to one of the plurality of the guide portions 500 of the at least one panel. Light from the light emitting member 100 disposed in the illuminating device 120 may be guided toward the cooking room 20 through the guide portion 500 (that is anti-reflective coating portion 250) of the location at which the illuminating device 120 is attached.

The door 40 of the oven 1 according to an embodiment of the present disclosure may include a heat dissipating member configured to cool the light emitting member 100.

Figure 21:
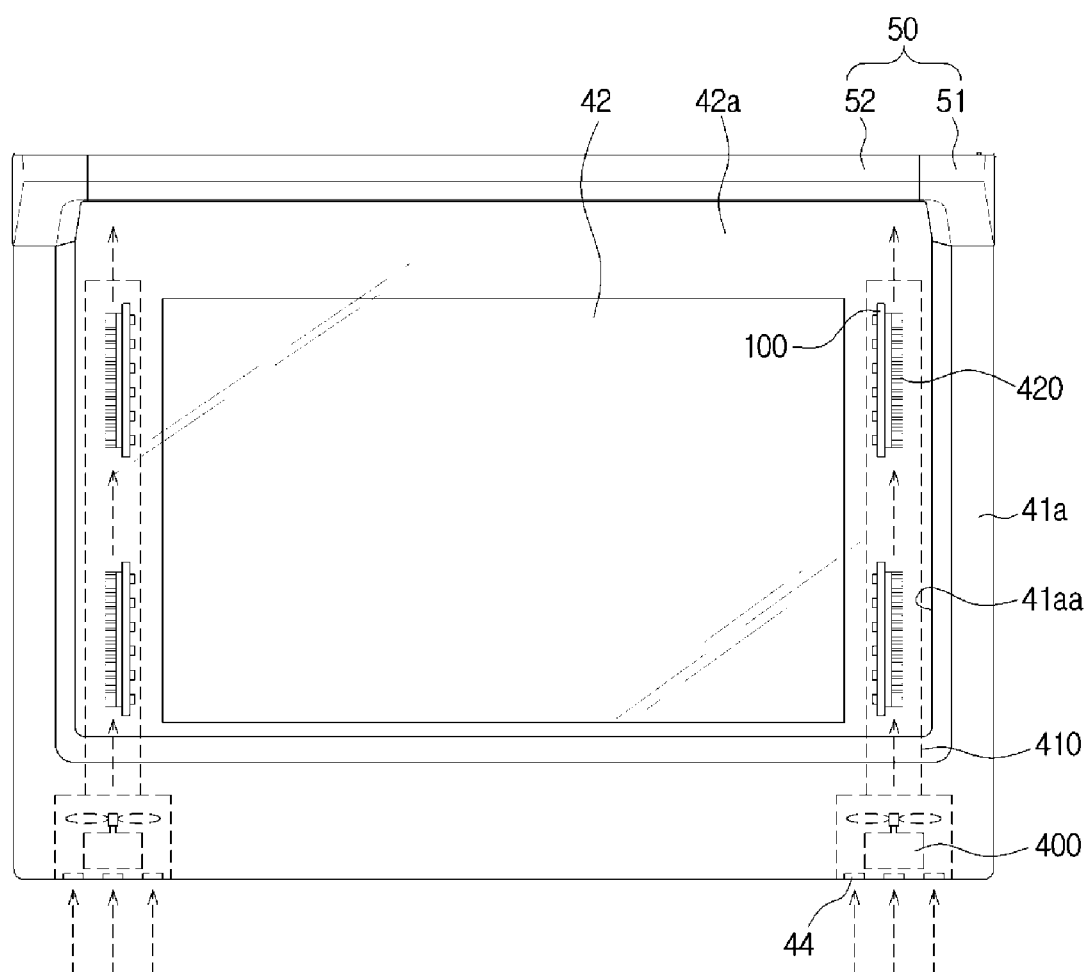
FIG. 21 is a front view of a door of an oven, the door inside which a plurality of light emitting members and a plurality of heat dissipating members are disposed, according to an embodiment of the present disclosure.
Figure 22:
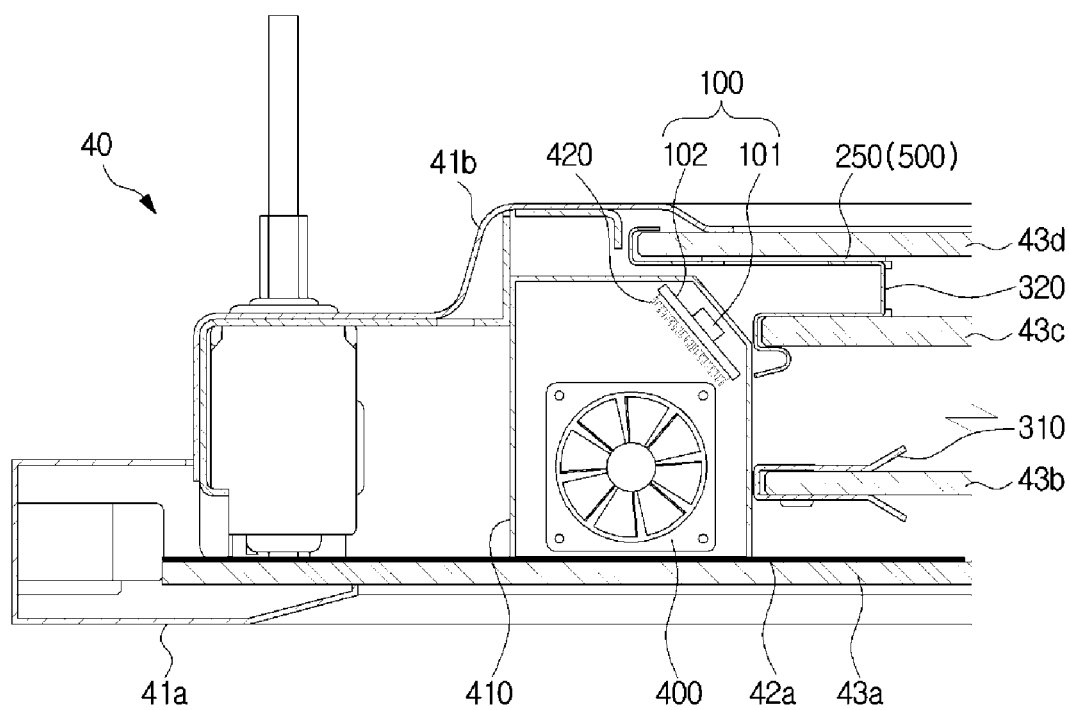
FIG. 22 is an enlarged view showing a part of the horizontal cross section of the door of the oven, the door inside which the plurality of light emitting members and the plurality of heat dissipating members are disposed, according to an embodiment of the present disclosure.

FIG. 21 is a front view of a door of an oven, the door inside which a plurality of light emitting members and a plurality of heat dissipating members are disposed, according to an embodiment of the present disclosure, and FIG. 22 is an enlarged view showing a part of the horizontal cross section of the door of the oven, the door inside which the plurality of light emitting members and the plurality of heat dissipating members are disposed, according to an embodiment of the present disclosure.

Referring to FIGS. 21 and 22, each heat dissipating member may include a fan 400 disposed at the lower portion of the door 40, and a heat dissipating board 420 attached on the rear surface of the PCB 102 of the light emitting member 100. Further, the heat dissipating member may include an air flow case 410 to transfer air inhaled by the fan 400 from the door inlet port 44 toward the light emitting member 100.

When the heat dissipating member is provided on the door 40, the light emitting member 100 may be prevented from being damaged by heat generated in the cooking room 20 so that the light emitting member 100 can be disposed closer to the cooking room 20. That is, the light emitting member 100 may be disposed close to the fourth panel 43d, so that only the fourth panel 43d can be provided with the guide portion 500, i.e., the anti-reflective coating portion 250, and also the light transmission efficiency may be improved.

A light emitting member according to an embodiment of the present disclosure may be attached directly on at least one panel of the plurality of panels 43.

Figure 23:
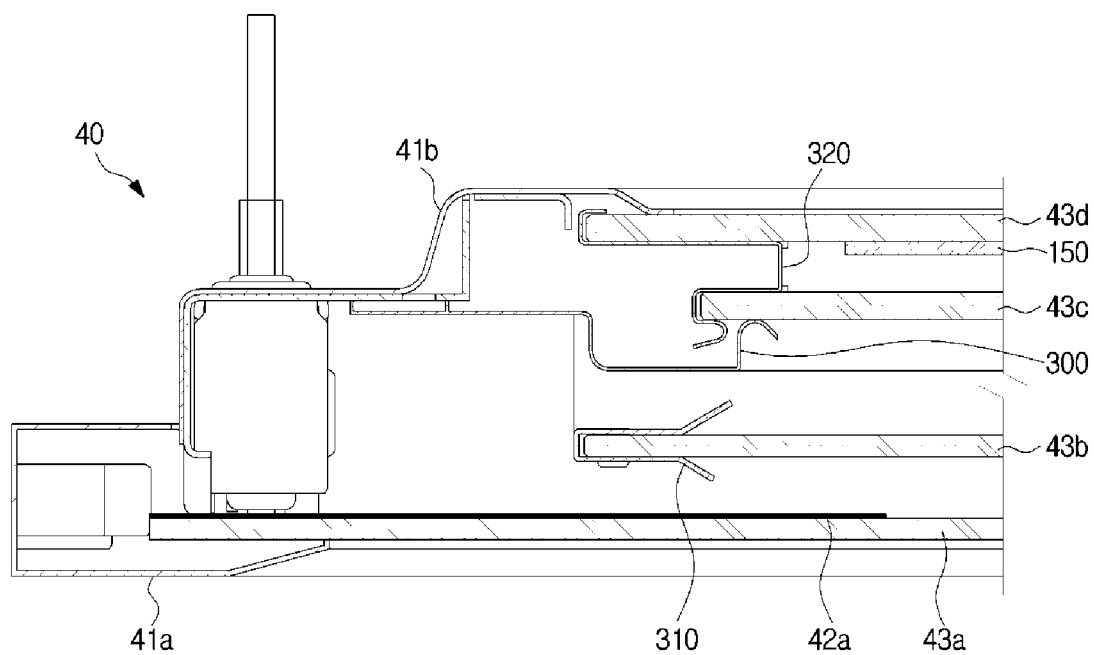
FIG. 23 is an enlarged view showing a part of the horizontal cross section of a door of an oven, the door in which a light emitting member is directly attached on a panel constituting a window, according to an embodiment of the present disclosure.

FIG. 23 is an enlarged view showing a part of the horizontal cross section of a door of an oven, the door in which a light emitting member is directly attached on a panel constituting a window, according to an embodiment of the present disclosure.

Referring to FIG. 23, the light emitting member 150 may be formed as an Organic Light Emitting Diode (OLED), and the light emitting member 150 may be attached directly on at least one of the plurality of panels 43 forming the window 42. In order to increase the light transmission efficiency, the light emitting member 150 may be attached on the front surface of the fourth panel 43d closest to the cooking room 20. Although it is not shown in the drawings, the light emitting member 150 may be attached on the first panel 43a, the second panel 43b, or the third panel 43c, and a guide portion may be provided in correspondence to a position at which the light emitting member 150 is attached.

Figure 24:
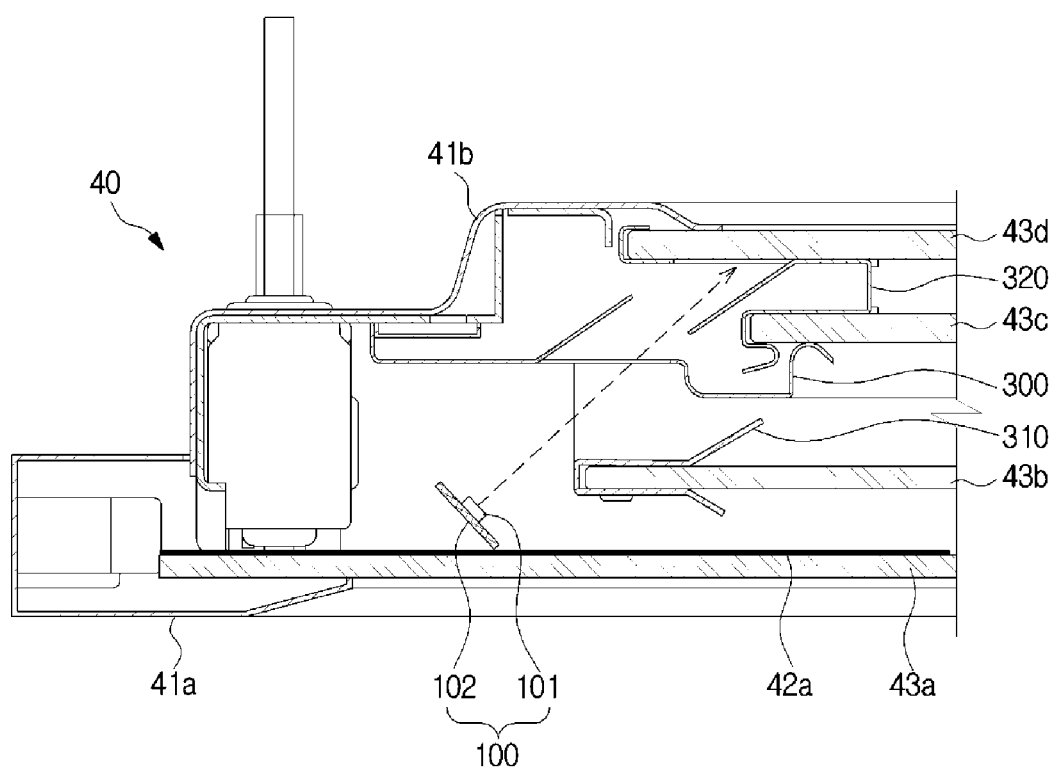
FIG. 24 is an enlarged view showing a part of the horizontal cross section of a door of an oven, the door provided with a door frame to form a path of light from a light emitting member according to an embodiment of the present disclosure.

FIG. 24 is an enlarged view showing a part of the horizontal cross section of a door of an oven, the door provided with a door frame to form a path of light from a light emitting member according to an embodiment of the present disclosure.

Referring to FIG. 24, the door 40 of the oven 1 may include the plurality of panels 43 to enable a user to look at the inside of the cooking room 20, a light emitting member 100 to illuminate the inside of the cooking room 20, and an internal structure supporting the plurality of panels 43. The internal structure may include the middle frame 300, the first fixing member 310, the second fixing member 320, and the like. The internal structure may be configured to form a path through which light emitted from the light emitting member 100 is directed to the cooking room 20.

The oven according to the present disclosure allows the user to check the cooking state of food through the window of the door without glare by the light emitting member and the guide member disposed on the door.

The oven according to the present disclosure may selectively illuminate upper and lower spaces of the cooking room divided by a rack.

The oven according to the present disclosure may selectively illuminate food placed to the left and food placed to the right inside the cooking room.

The oven according to the present disclosure may illuminate a user's desired position by removably attaching a light on the outer surface of the door.

The oven according to the present disclosure allows the user to check the cooking state of food through the window without glare by the light emitting member disposed on the door and the guide member disposed on the panel.

The oven according to the present disclosure may enable light generated from the light emitting member disposed on the door to be transmitted directly toward the cooking room without being blocked by the door frame.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An oven comprising:
    a main body having a cooking compartment;
    a door configured to open and close, and thereby open and close, respectively, the cooking compartment; and
    a light emitting member disposed at the door,
    wherein the door includes:
        a window configured to provide a view of an inside of the cooking compartment from an outside of the cooking compartment when the door is closed; and
        a guide member configured to guide the emitted light from the light emitting member toward the inside of the cooking compartment, and
    wherein the oven further includes at least one of the following:

the guide member includes a curved section,
the door further includes a handle, and the light emitting member is disposed inside the handle, and
the light emitting member is provided on an outer surface of the door.

2. The oven of claim 1, wherein the light emitting member and the guide member are disposed at at least one of a left side, a right side, an upper side and a lower side of the window.

3. The oven of claim 1, wherein the light emitting member and the guide member are disposed at at least one of a lower portion of a left side, an upper portion of the left side, a lower portion of a right side and an upper portion of the right side of the window.

4. The oven of claim 1, wherein the light emitting member and the guide member are disposed on at least one of a left portion of an upper side, a right portion of the upper side, a left portion of a lower side and a right portion of the lower side of the window.

5. The oven of claim 1, wherein the guide member includes at least one of a solid member configured to guide the emitted light from the light emitting member and a hollow member configured to guide the emitted light from the light emitting member.

6. The oven of claim 5, wherein the hollow member includes a reflecting surface configured to transmit the emitted light from the light emitting member from an incident end of the hollow member to an emitting end of the hollow member.

7. The oven of claim 1, wherein the guide member includes a first portion extending in a first direction from an incident surface of the guide member, and a second portion bent relative to the first portion and extending in a second direction different from the first direction.

8. The oven of claim 1, wherein the guide member includes a straight section.

9. The oven of claim 1, wherein the light emitting member includes a printed circuit board including a light emitting element,
wherein the printed circuit board is provided perpendicular to an incident surface of the guide member.

10. The oven of claim 9, wherein the printed circuit board is provided parallel to the window.

11. The oven of claim 9, wherein the printed circuit board is provided perpendicular to the window.

12. The oven of claim 1, wherein the guide member is disposed parallel to the window, and the guide member includes a reflecting surface formed to at least one of refract and reflect the light emitted from the light emitting member toward the cooking compartment.

13. The oven of claim 1, wherein at least one of an incident surface and an emitting surface of the guide member includes at least one of a flat surface, an inclined surface, a convex surface, and a concave surface.

14. The oven of claim 1, wherein an emitting surface of the guide member includes at least one of an irregular bumpy surface, a regular bumpy surface, and a printed surface.

15. The oven of claim 1, wherein the guide member includes a reflecting plate configured to reflect the light emitted from the light emitting member toward the cooking compartment.

16. The oven of claim 1, wherein the light emitting member is detachably provided on an outer surface of the window relative to the cooking compartment.

17. An oven comprising:
a main body having a cooking compartment;
a door configured to open and close, and thereby open and close, respectively, the cooking compartment; and
a light emitting member disposed at the door and configured to emit light to an inside of the cooking compartment,
wherein the door includes:
a window configured to provide a view of the inside of the cooking compartment from an outside of the cooking compartment when the door is closed; and a panel forming the window, the panel including a guide portion provided on one surface of the panel by a printing method or a coating method to guide the light emitted from the light emitting member toward the inside of the cooking compartment.

18. The oven of claim 17, wherein the light emitting member is disposed on at least one of the a left side, a right side, an upper side, and a lower side of the panel, and
the guide portion includes a reflecting surface configured to refract the light entered into the panel from the light emitting member toward the inside of the cooking compartment.

19. The oven of claim 18, wherein the reflecting surface includes at least one of an irregular bumpy surface, a regular bumpy surface, and a printed surface.

20. The oven of claim 18, wherein the reflecting surface is provided on one side of the panel corresponding to the side on which the light emitting member is disposed.

21. The oven of claim 17, wherein the guide portion includes an anti-reflective coating portion configured to transmit the emitted light from the light emitting member without reflecting the light.

22. The oven of claim 21, wherein the door further includes a handle disposed on the outer portion of the door,
the light emitting member is disposed inside the handle, and
the light emitted by the light emitting member passes through the anti-reflective coating portion to be guided to the inside of the cooking compartment.

23. The oven of claim 21, wherein the panel includes a plurality of guide portions,
the light emitting member is disposed in an illuminating device configured to be detachably attached on the panel, and
the illuminating device is attached at a position corresponding to one guide portion of the plurality of guide portions, and configured to emit light toward the inside of the cooking compartment.

24. The oven of claim 23, wherein the illuminating device includes:
a power supply configured to supply electric power to the light emitting member; and
a transceiver configured to exchange signals with the main body.

25. The oven of claim 17, wherein the door includes a fan configured to cool heat generated by the light emitting member.

26. The oven of claim 25, wherein the light emitting member includes a light emitting element, a printed circuit board on which the light emitting element is mounted, and a heat dissipating board attached on a rear surface of the printed circuit board.

27. The oven of claim 17, wherein the light emitting member is disposed to be directly attached on the panel.

28. An oven comprising:
a main body having a cooking compartment;
a door configured to open and close, and thereby open and close, respectively, the cooking compartment; and a light emitting member disposed at the door and configured to emit light to an inside of the cooking compartment, wherein the door includes:

a plurality of panels configured to provide a view of the inside of the cooking compartment from an outside of the cooking compartment when the door is closed; and an internal structure configured to support the plurality of panels, and to form a path for the light emitted by the light emitting member to travel to the inside of the cooking compartment through the plurality of panels.

* * * * *

UNITED STATES PATENT AND TRADEMARK OFFICE
CERTIFICATE OF CORRECTION

PATENT NO. : 10,551,069 B2  
APPLICATION NO. : 15/609258  
DATED : February 4, 2020  
INVENTOR(S) : Ji-Woon Je et al.

Page 1 of 1

It is certified that error appears in the above-identified patent and that said Letters Patent is hereby corrected as shown below:

In the Claims

Column 18, Line 16, In Claim 18, after "at least one of" delete "the".

Signed and Sealed this  
Twenty-fourth Day of March, 2020

Andrei Iancu  
*Director of the United States Patent and Trademark Office*